US009261896B2

(12) United States Patent
Seki et al.

(10) Patent No.: US 9,261,896 B2
(45) Date of Patent: Feb. 16, 2016

(54) FORCE SENSE PRESENTATION APPARATUS

(75) Inventors: Kousuke Seki, Tokyo (JP); Hideo Kawabe, Saitama (JP); Osamu Ito, Tokyo (JP); Takeshi Maeda, Tokyo (JP)

(73) Assignee: Sony Corporation, Tokyo (JP)

(*) Notice: Subject to any disclaimer, the term of this patent is extended or adjusted under 35 U.S.C. 154(b) by 245 days.

(21) Appl. No.: 13/613,639

(22) Filed: Sep. 13, 2012

(65) Prior Publication Data

US 2013/0082829 A1 Apr. 4, 2013

(30) Foreign Application Priority Data

Oct. 3, 2011 (JP) ................... 2011-219224

(51) Int. Cl.
| | |
|---|---|
| *H04B 3/36* | (2006.01) |
| *G08B 21/00* | (2006.01) |
| *A63F 9/24* | (2006.01) |
| *A63F 13/00* | (2014.01) |
| *G06F 17/00* | (2006.01) |
| *G06F 19/00* | (2011.01) |
| *G05G 9/047* | (2006.01) |
| *G06F 3/01* | (2006.01) |
| *G06F 3/0346* | (2013.01) |

(52) U.S. Cl.
CPC ............... *G05G 9/047* (2013.01); *G06F 3/016* (2013.01); *G06F 3/0346* (2013.01)

(58) Field of Classification Search
CPC . G06F 3/016; G06F 2203/014; G06F 3/0346; G06F 3/041; G06F 2203/013; G06F 2203/015; G06F 3/0414; G06F 3/045; G06F 2203/0333; G06F 2203/04105; A63F 2300/1037; G05G 2009/04766; H04R 2499/11; Y10S 323/904

USPC .................... 340/407.1, 665; 463/46
See application file for complete search history.

(56) References Cited

U.S. PATENT DOCUMENTS

| | | | | |
|---|---|---|---|---|
| 4,795,296 | A * | 1/1989 | Jau .................................... | 414/5 |
| 6,353,427 | B1 * | 3/2002 | Rosenberg .................... | 345/156 |
| 6,515,651 | B1 * | 2/2003 | Berstis .......................... | 345/157 |
| 7,635,325 | B2 * | 12/2009 | Chiang et al. ................ | 482/146 |
| 8,172,838 | B2 * | 5/2012 | Schnitzler ...................... | 606/45 |
| 8,976,045 | B2 * | 3/2015 | Norieda .......................... | 341/20 |

(Continued)

FOREIGN PATENT DOCUMENTS

JP 2011-059934 A 3/2011

OTHER PUBLICATIONS

Frohlich et al. The Cubic Mouse: a new device for three-dimensional input Apr. 1, 2000.*

*Primary Examiner* — Jennifer Mehmood
*Assistant Examiner* — Emily C Terrell
(74) *Attorney, Agent, or Firm* — Wolf, Greenfield & Sacks, P.C.

(57) ABSTRACT

A force sense presentation apparatus includes a main body, a first movable unit, and a first drive mechanism. The main body has a longitudinal direction in a first axis direction and includes a holding unit held by a user. The first movable unit is configured to cover at least a part of the holding unit and is capable of being displaced with respect to the main body in a second axis direction which intersects the first axis. The first drive mechanism is provided to the main body and configured to cause the first movable unit to be displaced in the second axis direction with respect to the main body to generate a moment about a third axis to the holding unit. The third axis intersects the first axis and the second axis.

13 Claims, 15 Drawing Sheets

(56) References Cited

U.S. PATENT DOCUMENTS

| | | |
|---|---|---|
| 2001/0026266 A1* | 10/2001 | Schena et al. ............... 345/163 |
| 2007/0091063 A1* | 4/2007 | Nakamura et al. ........... 345/156 |
| 2008/0059131 A1* | 3/2008 | Tokita et al. ..................... 703/5 |
| 2008/0083314 A1* | 4/2008 | Hayashi et al. ................. 84/22 |
| 2010/0090973 A1* | 4/2010 | Algreatly ....................... 345/173 |
| 2010/0101480 A1* | 4/2010 | Sugahara ....................... 116/205 |
| 2010/0103640 A1* | 4/2010 | Brown et al. .................. 361/829 |
| 2011/0043447 A1* | 2/2011 | Inaba et al. .................... 345/157 |
| 2011/0310002 A1* | 12/2011 | Tidemand et al. ............ 345/156 |
| 2012/0251991 A1* | 10/2012 | Savitsky et al. ............... 434/262 |

* cited by examiner

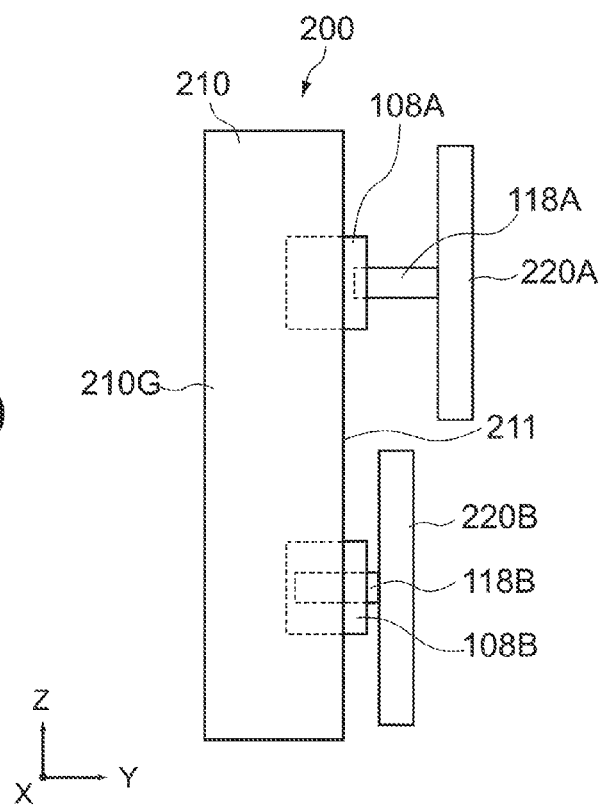
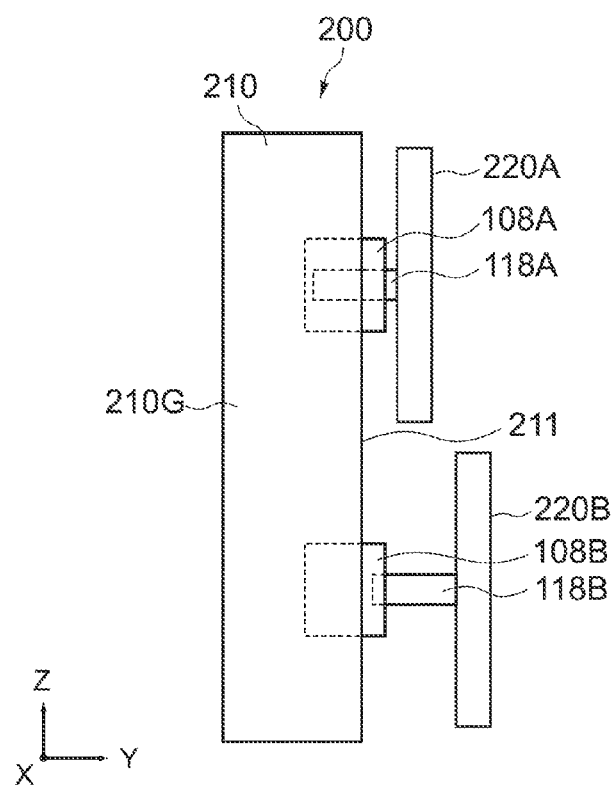

FORCE SENSE PRESENTATION APPARATUS

BACKGROUND

The present disclosure relates to a force sense presentation apparatus that presents a force sense to a user.

In related art, various apparatuses capable of presenting a force sense to a user are known. For example, there is known a joystick which is provided with an operation lever capable of being tilted and rotated about an axis, a motor for tilting and rotating the operation lever, a sensor that detects a distance or the like to an obstacle, a control unit that controls the motor, and the like. In this technique, the joystick is attached to a wheelchair or a crane to be used, and the control unit controls the rotation of the motor when the sensor detects that the joystick approaches an obstacle, for example, thereby making it possible to give the user a reaction force with respect to an operation force of the user (see, paragraphs 0008, 0009, and 0022 of Japanese Patent Application Laid-open No. 2011-59934).

SUMMARY

In the above-mentioned technique, however, the joystick is not a non-grounded apparatus but a grounded apparatus which is used by being attached to a wheelchair, a crane, or the like. As a non-grounded electronic apparatus, known is a controller of a space operation type which is used for a game or the like. In such a controller, to present an instinctive force sense to a user during a game is demanded in order to increase the reality of the game.

In view of the above-mentioned circumstances, it is desirable to provide a force sense presentation apparatus capable of presenting an instinctive force sense to a user.

According to an embodiment of the present disclosure, there is provided a force sense presentation apparatus including a main body, a first movable unit, and a first drive mechanism.

The main body has a longitudinal direction in a first axis direction and includes a holding unit held by a user.

The first movable unit is configured to cover at least a part of the holding unit, and is capable of being displaced with respect to the main body in a second axis direction which intersects the first axis.

The first drive mechanism is provided to the main body and configured to cause the first movable unit to be displaced in the second axis direction with respect to the main body to generate a moment about a third axis to the holding unit, and the third axis intersects the first axis and the second axis.

The force sense presentation apparatus can generate the moment about the third axis to the holding unit by displacing the first movable unit in the second axis direction with respect to the main body with the first drive mechanism, so it is possible to present an instinctive force sense to the user who holds the holding unit.

The first drive mechanism may include a plurality of drive sources disposed separately from each other in the first axis direction. With this structure, it is possible to give a force to the first movable unit on the separate positions in the first axis direction and displace the first movable unit in the second axis direction.

The first movable unit may be a plate-shaped member having a longitudinal direction in the first axis direction, and the first drive mechanism may further include a tilt mechanism unit capable of tilting the plate-shaped member about the third axis by driving the plurality of drive sources. With this structure, the tilt mechanism unit tilts the plate-shaped member about the third axis, with the result that the moment about the third axis can be generated to the holding unit.

The plate-shaped member may have a first end portion and a second end portion which are separated from each other in the first axis direction. In this case, the tilt mechanism unit includes a first drive source, a second drive source, and a coupling unit. The first drive source is capable of moving the first end portion. The second drive source is capable of moving the second end portion in a direction opposite to a movement direction of the first end portion. The coupling unit is disposed between the first drive source and the second drive source and configured to support the plate-shaped member rotatably about an axis parallel to the third axis.

On the other hand, the first movable unit may include a first plate-shaped member having a longitudinal direction in the first axis direction and a second plate-shaped member opposed to the first plate-shaped member in the second axis direction with the main body disposed therebetween. In this case, the first drive mechanism includes a tilt mechanism unit capable of tilting the first plate-shaped member and the second plate-shaped member about the third axis by driving the plurality of drive sources.

With this structure, the first plate-shaped member and the second plate-shaped member can be tilted about the third axis, and the moment about the third axis can be generated to the holding unit, with the result that it is possible to present a more instinctive force sense to the user.

The first movable unit may include a first plate-shaped member and a second plate-shaped member which are separated from each other in the first axis direction, and the first drive mechanism may include a direct acting mechanism unit. The direct acting mechanism unit is configured to move the first plate-shaped member and the second plate-shaped member in opposite directions to each other along the second axis direction by driving the plurality of drive sources.

With this structure, it is possible to move the first plate-shaped member and the second plate-shaped member in opposite directions to each other along the second axis direction and generate the moment about the third axis to the holding unit.

The first movable unit may further include a third plate-shaped member opposed to the first plate-shaped member with the main body disposed therebetween, and a fourth plate-shaped member opposed to the second plate-shaped member with the main body disposed therebetween. In this case, the first drive mechanism moves the third plate-shaped member in the same direction as the first plate-shaped member and moves the fourth plate-shaped member in the same direction as the second plate-shaped member.

With this structure, it is possible to further increase the moment about the third axis with the use of the first to fourth plate-shaped members, and thus it is possible to present a more instinctive force sense to the user.

The plurality of drive sources may be formed of direct acting actuators. With this structure, it is possible to give a force to the first movable unit with a direct acting cylinder and displace the first movable unit.

The plurality of drive sources may be formed of vibration motors. With this structure, by vibrating the first movable unit with the vibration motors, it is possible to present an instinctive force sense to the user.

The force sense presentation apparatus may further include a second movable unit and a second drive mechanism. The second movable unit is configured to cover another part of the holding unit, and the second movable unit is capable of being displaced in the third axis direction with respect to the main body.

The second drive mechanism is provided to the main body and configured to cause the second movable unit to be displaced in the third axis direction with respect to the main body to generate a moment about the second axis to the holding unit.

With this structure, it is possible to generate moments about a plurality of axes to the holding unit, so it is possible to present more various force senses to the user.

According to the embodiments of the present disclosure, it is possible to present the instinctive force sense to the user.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 10 is a side view showing a state of the force sense presentation apparatus shown in FIG. 9;

FIG. 11 is a side view showing another state of the force sense presentation apparatus shown in FIG. 9;

DETAILED DESCRIPTION OF EMBODIMENTS

Hereinafter, embodiments of the present disclosure will be described with reference to the drawings.

First Embodiment

Figure 1:
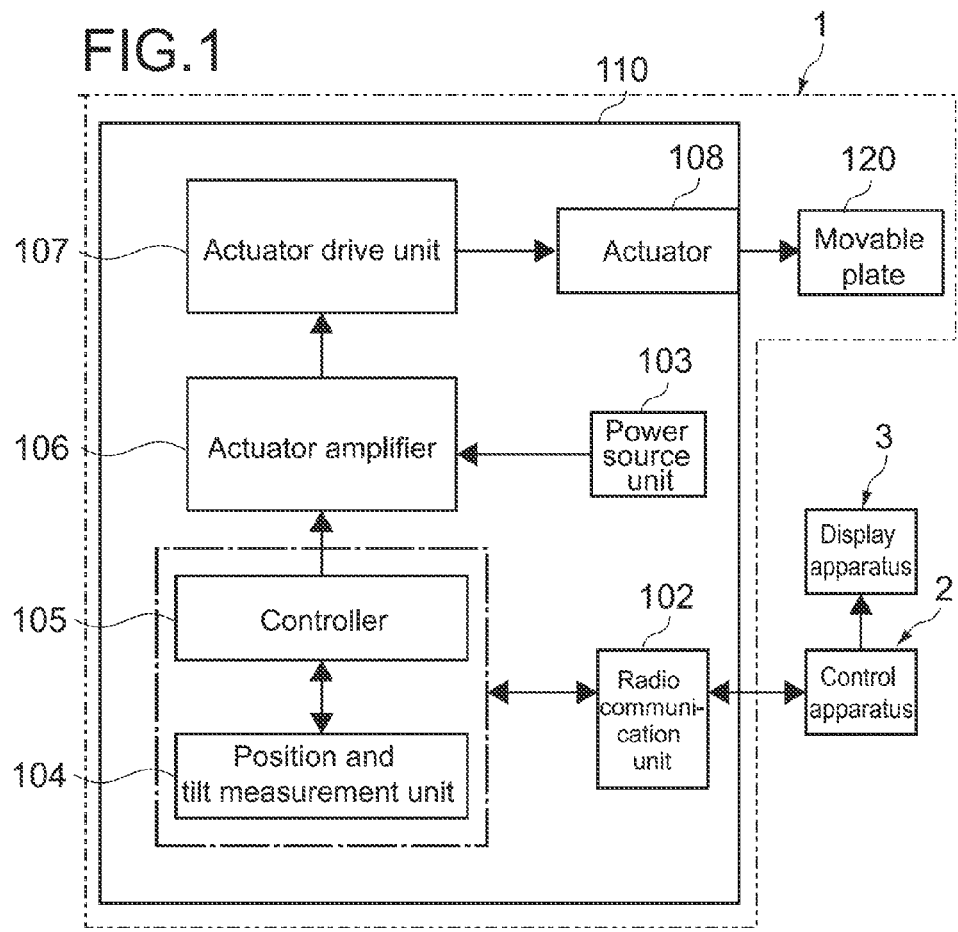
FIG. 1 is a diagram showing a system structure using a force sense presentation apparatus according to a first embodiment of the present disclosure.
Figure 2:
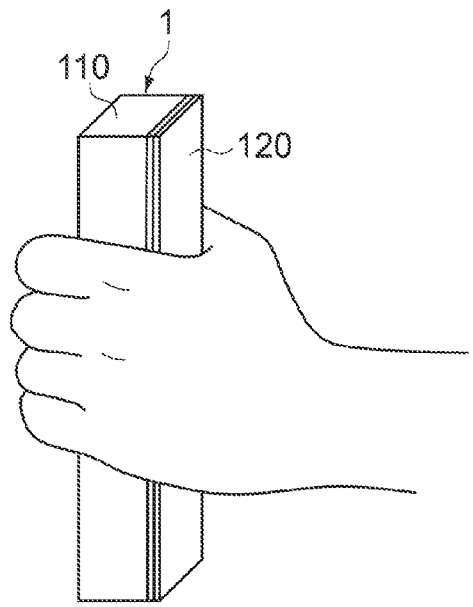
FIG. 2 is a perspective view showing a state in which the force sense presentation apparatus shown in FIG. 1 is held by a user.
Figure 3:
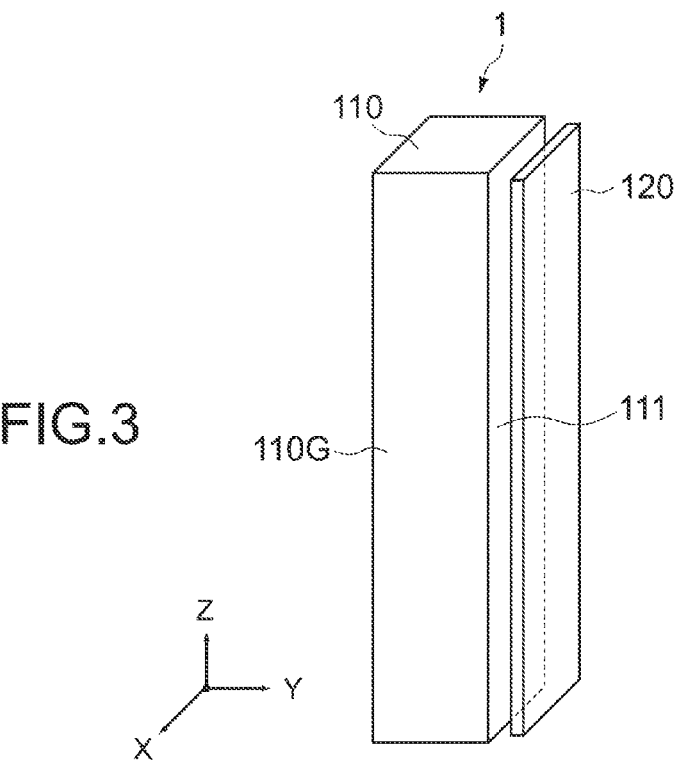
FIG. 3 is a perspective view showing a force sense presentation apparatus shown in FIG. 2.
Figure 4:
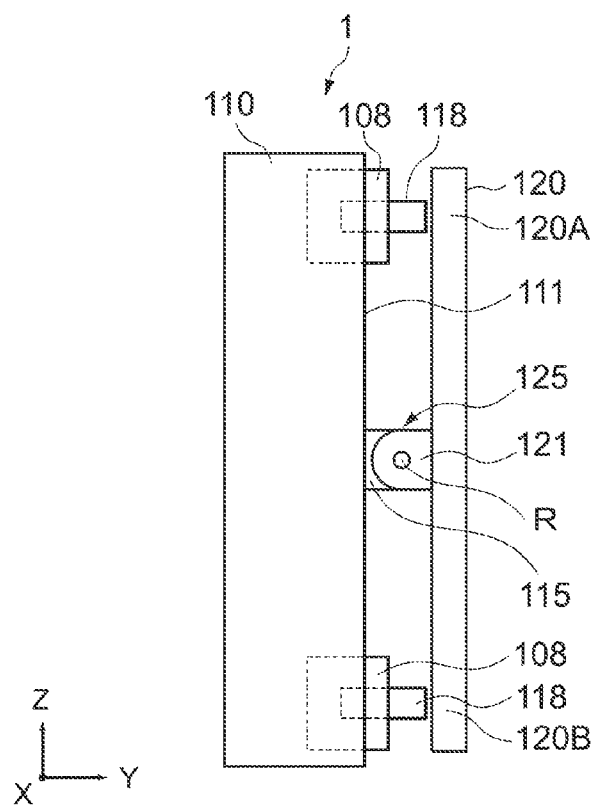
FIG. 4 is a side view showing the force sense presentation apparatus shown in FIG. 3.

FIG. 1 is a diagram showing a system structure using a force sense presentation apparatus according to a first embodiment of the present disclosure. FIG. 2 is a perspective view showing a state in which the force sense presentation apparatus shown in FIG. 1 is held by a user. FIG. 3 is a perspective view showing a force sense presentation apparatus 1 shown in FIG. 2, and FIG. 4 is a schematic side view showing the force sense presentation apparatus 1 shown in FIG. 3. For ease of explanation, the structures of main parts are shown exaggeratingly. It should be noted that in FIGS. 3 and 4, X, Y, and Z axes indicate three axis directions perpendicular to each other.

The force sense presentation apparatus 1 in this embodiment is capable of configuring a force sense presentation system by being combined with a control apparatus 2 or the control apparatus 2 and a display apparatus 3, for example.

(Force Sense Presentation Apparatus)

The force sense presentation apparatus 1 has such a size as to be held by a user (see, FIG. 2) and is an approximately rectangular parallelepiped having a longitudinal direction along the Z axis direction, for example. In this embodiment, the force sense presentation apparatus 1 is mainly configured as a controller of a space operation type, which is used for a game. When the user moves the force sense presentation apparatus 1 in space, the force sense presentation apparatus 1 generates an operation signal including information relating to the movement and transmits the operation signal to the control apparatus 2. The force sense presentation apparatus 1 receives the signal from the control apparatus 2 as will be described later and is capable of presenting a force sense to the user in accordance with the signal.

The force sense presentation apparatus 1 is provided with a main body 110 having a holding unit 110G held by the user and a movable plate 120 (first movable unit) to be described later. The main body 110 is formed into an approximately quadrangular prism having a longitudinal direction along the Z axis direction. In the main body 110, a radio communication unit 102, a power supply unit 103, a position and tilt measurement unit 104, a control unit 105, an actuator amplifier 106, an actuator drive unit 107, and a plurality of actuators 108A and 108B (hereinafter, referred to as actuators 108 except for the case of being explained individually) as a plurality of drive sources are contained.

The main body 110 is formed into an approximately rectangular parallelepiped having a longitudinal direction along the Z axis direction. The control unit 105, the actuator drive unit 107, the plurality of actuators 108, and the like constitute a "first drive mechanism" that causes the holding unit 110G to generate a moment about the X axis by displacing the movable plate 120 with respect to the main body 110 in the Y axis direction.

The radio communication unit 102 is configured by a radio communication module that makes bidirectional communication between the radio communication unit 102 and a radio communication unit of the control apparatus 2 possible, but may perform wired communication. The communication system is not particularly limited and may be communication between apparatuses such as "ZigBee" (registered trademark) and "Bluetooth" (registered trademark) or may be communication via the Internet.

The power supply unit 103 forms a power supply of the force sense presentation apparatus 1 and supplies necessary power to each part in the main body 110. The power supply unit 103 is formed of a battery in general. The battery may be a primary battery or a secondary battery. Further, the power supply unit 103 may be formed of a solar battery. It should be noted that in the case where a wired or wireless power supplying is performed, the power supply unit 103 is unnecessary.

The position and tilt measurement unit 104 includes a sensor for measuring a position, a tilt, and the like of the force sense presentation apparatus 1 operated in space. As the sensor, typically, an acceleration sensor or an angular velocity sensor is used. The position and tilt measurement unit 104 is capable of detecting the movement of the main body 110 in each of the X, Y, and Z axis directions, but the structure is not particularly limited. For example, the acceleration sensor may be disposed along each of the directions, or one or more angular velocity sensors may be combined. In addition, a geomagnetic sensor, a pressure sensor, or the like may be used in conjunction therewith.

The radio communication unit 102, the power supply unit 103, the position and tilt measurement unit 104, and the like may not be formed in the main body 110 but may be formed as an external apparatus of the force sense presentation apparatus 1.

The control unit 105 is formed of a computer including a ROM, a RAM, and a CPU (MPU) and is capable of obtaining various pieces of information relating to a game via the ratio communication unit 102, for example. The various pieces of information of the game include information of a result of a hit determination between an operation target of the user (for example, a bat in a baseball game, a fishing rod in a fishing game, or a flying pan in a cooking game) and an object (for example, a ball, fish, an ingredient, or the like in the various games) that gives a force to the operation target. Here, the hit determination refers to a determination whether the operation target and the object have a predetermined relationship such as a contact on a screen.

The control unit 105 can obtain an output signal of the position and tilt measurement unit 104, generate the operation signal on the basis of the output signal, and output the signal to the radio communication unit 102. The output signal of the position and tilt measurement unit 104 includes information relating to the movement of the main body 110 such as an acceleration and an angular velocity of the main body 110 which are measured by the position and tilt measurement unit 104 and the position of the operation target of the user, which is calculated with the use of those values. The operation signal is transmitted to the control apparatus 2 by the radio communication unit 102.

On the basis of various pieces of information (including result information of the hit determination mentioned above) of the game obtained through the radio communication unit 102, the control unit 105 outputs a predetermined drive signal to the actuator amplifier 106.

The actuator amplifier 106 amplifies the drive signal received from the control unit 105 and outputs the signal to the actuator drive unit 107.

The actuator drive unit 107 outputs a drive signal to the plurality of actuators 108 on the basis of the drive signal from the actuator amplifier 106.

The plurality of actuators 108 can be driven on the basis of the drive signal from the actuator drive unit 107 and displace the movable plate 120 with respect to the main body 110.

The movable plate 120 covers a part of the holding unit 110G and is provided on the side of a side surface 111 of the main body 110. The movable plate 120 is capable of being displaced in the Y axis direction with respect to the main body 110.

In this embodiment, the movable plate 120 is a plate shaped member having a longitudinal direction along the Z axis direction similarly to the longitudinal direction of the main body 110 and is supported so as to be tilted with respect to the main body 110 through a coupling unit 125. The coupling unit 125 and the plurality of actuators 108 constitute a "tilt mechanism unit" for tilting the movable plate 120 about the X axis.

The coupling unit 125 supports the movable plate 120 in a rotatable manner about a shaft R which is parallel to the X axis. The coupling unit 125 has a coupling projection unit 115 provided to the main body 110 and a coupling projection unit 121 provided to the movable plate 120. The coupling projection unit 115 is provided on the side of the side surface 111 of the main body 110 so as to be projected from the side surface 111, and the coupling projection unit 115 is provided on the center of the main body 110 in the longitudinal direction. The coupling projection unit 121 is provided on the center of the movable plate 120 in the longitudinal direction. The coupling projection unit 121 is coupled with the coupling projection unit 115 so that a first end portion 120A and a second end portion 120B, which are both end portions of the movable plate 120 in the longitudinal direction, are capable of approaching and distancing the side surface 111.

The plurality of actuators 108 are provided so as to be embedded on the side of the side surface 111 of the main body 110. The plurality of the actuators 108 are constituted of two actuators 108A (first drive source) and 108B (second drive source) provided on the both end portions of the main body 110 so as to be separated from each other in the Z axis direction. The actuator 108A causes the first end portion 120A of the movable plate 120 to move, and the actuator 108B causes the second end portion 120B of the movable plate 120 to move.

The actuators 108A and 108B have drive shafts 118A and 118B, respectively. The drive shafts 118A and 118B are movable in the Y axis direction perpendicular to the side surface 111 of the main body 110. When the drive shafts 118 are positioned to an initial position shown in FIGS. 3 and 4, an adjustment is made so that tip ends of the drive shafts 118 are brought into contact with the movable plate 120, for example. When the drive shafts 118 are positioned on the initial position, the movable plate 120 is disposed in parallel to the side surface 111 of the main body 110.

For the actuators 108A and 108B, direct acting type actuators such as direct acting motors and direct acting cylinders are used. The amounts of movement of the drive shafts 118A and 118B are controlled with the use of a current that is supplied through the actuators 108A and 108B, for example. A direction of each of the movements of the drive shafts 118A and 118B is controlled with a direction of the current that is supplied through the actuators 108, for example. It should be noted that a vibration motor such as a voice coil motor may be used as the actuators 108, as will be described later.

Figure 5:
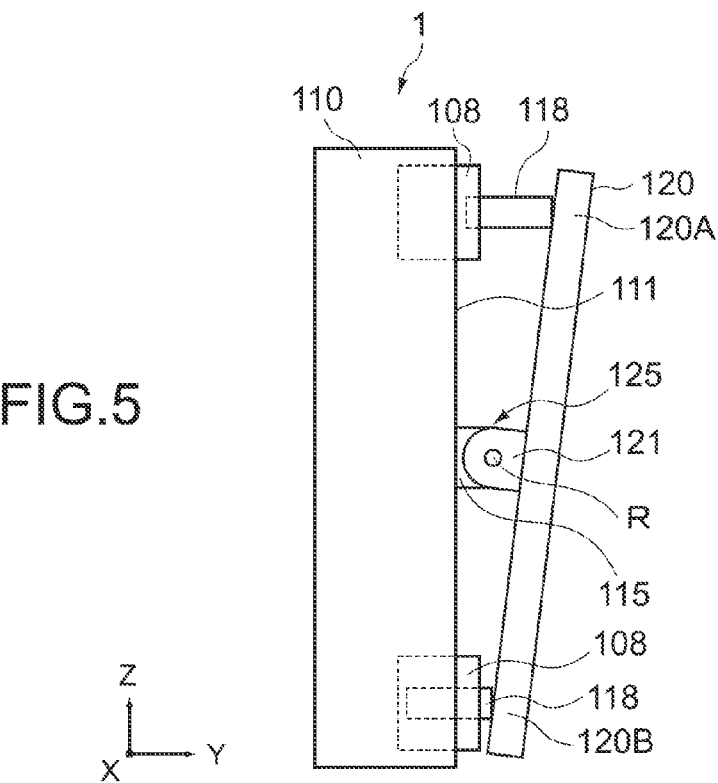
FIG. 5 is a side view showing a state of the first movable unit of the force sense presentation apparatus 1 shown in FIG. 4.
Figure 6:
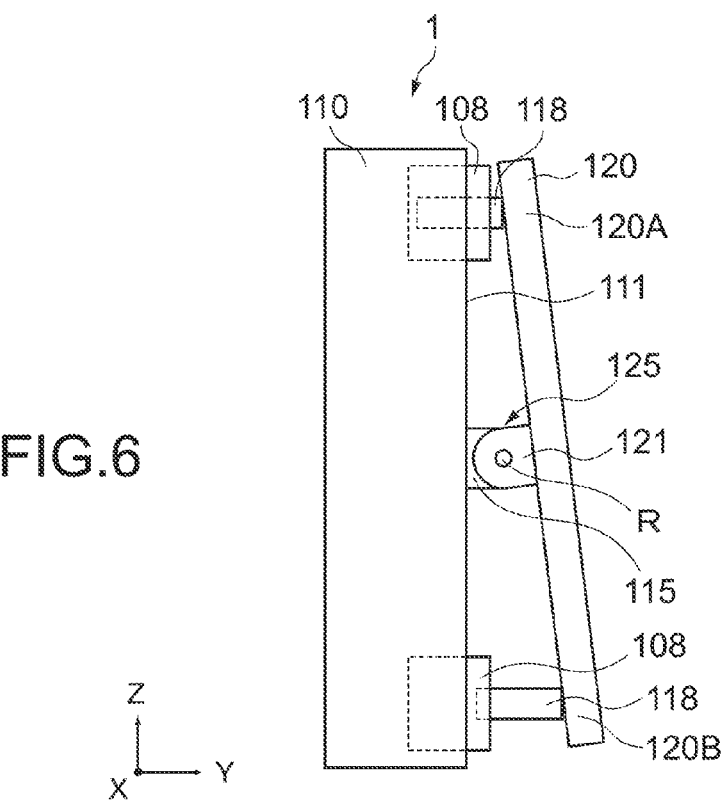
FIG. 6 is a side view showing another state of the first movable unit of the force sense presentation apparatus shown in FIG. 4.

FIG. 5 is a side view showing a state of the first movable unit 120 of the force sense presentation apparatus 1 shown in FIG. 4, and FIG. 6 is a side view showing another state of the first movable unit 120 of the force sense presentation apparatus 1 shown in FIG. 4.

In the case where the drive shaft 118A, out of the plurality of drive shafts 118A and 118B, is moved in a positive Y axis direction (rightward in the figure), the control unit 105 drives the actuators 108A and 108B so that the other drive shaft 118B is moved in a negative Y axis direction (leftward in the figure). As a result, as shown in FIG. 5, the first end portion 120A of the movable plate 120 is distanced from the side surface 111 of the main body 110, and the second end portion 120B of the movable plate 120 approaches the side surface 111 of the main body 110, thereby causing a state in which the movable plate 120 is tilted obliquely with respect to the side surface 111 of the main body 110 as shown in FIG. 5.

In the same way, in the case where the drive shaft 118A is moved in the negative Y axis direction, the control unit 105 drives the actuators 108A and 108B so that the other drive shaft 118B is moved in the positive Y axis direction. As a result, as shown in FIG. 6, the first end portion 120A of the movable plate 120 approaches the side surface 111 of the main body 110, and the second end portion 120B of the movable plate 120 is distanced from the side surface 111 of the main body 110, thereby causing a state in which the movable plate 120 is tilted obliquely with respect to the side surface 111 of the main body 110 as shown in FIG. 6.

(Control Apparatus)

The control apparatus 2 has a video RAM, a display control unit, an MPU, a RAM, a ROM, and a radio communication unit, for example.

The radio communication unit of the control apparatus 2 is capable of transmitting a signal including various pieces of information of a game or the like to the force sense presentation apparatus 1 and receiving an operation signal (to be described later) transmitted from the force sense presentation apparatus 1. The MPU analyzes the operation signal from the force sense presentation apparatus 1 and performs various calculation processes with the use of various set values and programs stored in the RAM and the ROM. As an example of the calculation processes, on the basis of the operation signal, the MPU calculates (updates) a position of an operation target of the user, which is displayed on a screen of the display apparatus 3. The display control unit mainly generates screen data to be displayed on the screen of the display apparatus 3 in accordance with the control by the MPU. The screen data includes a pointer, an icon, the operation targets of the user in the game, and the like. The video RAM is a work area of the display control unit and temporarily stores the screen data generated.

The control apparatus 2 is a gaming apparatus, for example, but may be an apparatus dedicated to the force sense presentation apparatus 1 or a general information processing apparatus such as a PC (personal computer). Further, the control apparatus 2 may be a computer which is integrated with the display apparatus 3. A control target apparatus by the control apparatus 2 may be audiovisual equipment, a projector, a car navigation apparatus, or the like.

(Display Apparatus)

The display apparatus 3 displays an image or the like of the operation target of the user on the screen on the basis of the output information from the control apparatus 2, for example. Examples of the display apparatus 3 include a liquid crystal display and an EL (Electro-Luminescence) display but are not limited to those. The display apparatus 3 may be an apparatus which is integrated with a display capable of receiving a television broadcast or the like. The display apparatus 3 may be formed of a 3D television or the like which is capable of displaying a 3D image on the screen.

(Operation)

Figure 7:
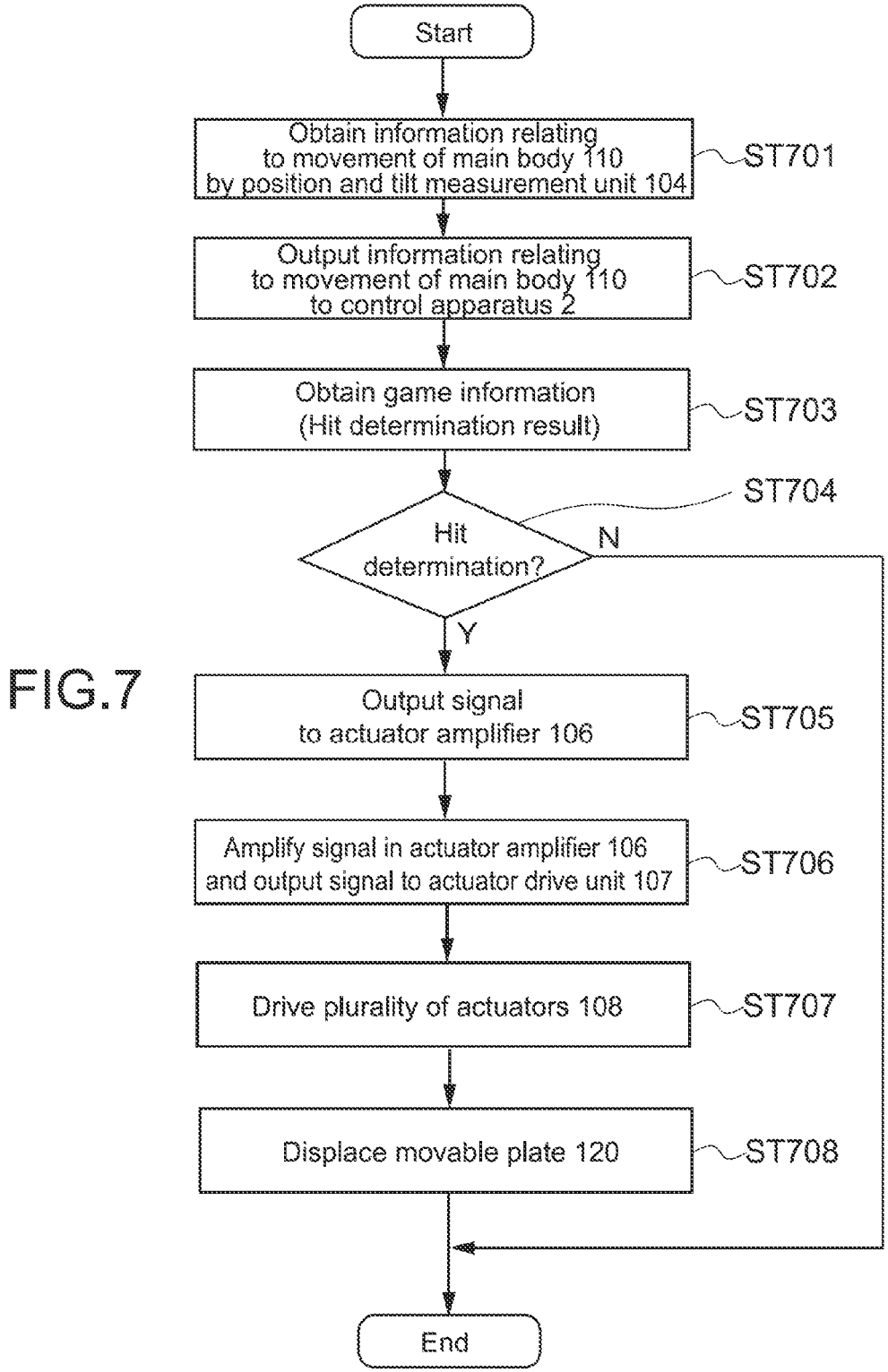
FIG. 7 is a flowchart for explaining an operation example of the force sense presentation apparatus shown in FIG. 4.

FIG. 7 is a flowchart for explaining an operation example of the force sense presentation apparatus 1 shown in FIG. 4.

In this operation example, a description is given on an operation example in which the force sense presentation apparatus 1 displaces the movable plate 120 to present a force sense to the user in accordance with a result of the hit determination between the operation target of the user (for example, a bat, a fishing rod, or a flying pan) in various games and an object (for example, a ball, fish, or an ingredient, hereinafter referred to as a hit determination target) that gives a force to the operation target.

The user holds the holding unit 110G of the main body 110 over the movable plate 120 to operate the force sense presentation apparatus 1 in space while watching an image displayed on the screen of the display apparatus 3. The control unit 105 obtains, from the position and tilt measurement unit 104, information relating to the movement of the main body 110 (ST701). The information relating to the movement includes information such as the position of the operation target of the user and the acceleration and the angular velocity of the force sense presentation apparatus 1.

The control unit 105 calculates the latest position of the operation target of the user on the basis of the information relating to the movement obtained in ST701 and transmits the information such as the position to the control apparatus 2 via the radio communication unit 102 (ST702).

On the other hand, the control apparatus 2 receives the signal transmitted from the force sense presentation apparatus 1 in ST702 and updates the position of the operation target of the user. Further, the control apparatus 2 calculates and updates the position of the hit determination target. Then, the control apparatus 2 transmits the position information and the image data to the display apparatus 3. As a result, the updated operation target of the user and the updated hit determination target are displayed at a predetermined position on the screen of the display apparatus 3. The control apparatus 2 determines, for example, whether the position of the updated operation target of the user coincides with the position of the updated hit determination target or not (hit determination) and transmits result information of the hit determination to the force sense presentation apparatus 1.

The control unit 105 obtains various pieces of information of the game including the result information or the like of the hit determination from the control apparatus 2 via the radio communication unit 102 (ST703).

The control unit 105 determines whether the hit determination result from the control apparatus 2 is an affirmative determination or not on the basis of the result information of the hit determination obtained in ST703 (ST704). In the case where a negative determination is obtained in ST704, the process is terminated, and in the case where the affirmative determination is obtained in ST704, the process proceeds to ST705.

In the case where the hit determination is obtained in ST704, the control unit 105 outputs a predetermined drive signal to the actuator amplifier 106 (ST705). Specifically, the predetermined drive signal includes the information relating to the amounts of movement of the plurality of drive shafts 118, the movement directions, and the like. At this time, the control unit 105 outputs the drive signal so that the movement speeds and the amounts of movement of both the drive shafts 118 are coincided with each other, and the movement directions are opposite to each other.

The actuator amplifier 106 amplifies those drive signals received from the control unit 105 to output the signals to the actuator drive unit 107 (ST706).

The actuator drive unit 107 generates a drive signal on the basis of the drive signal from the actuator amplifier 106 and outputs the drive signal to the plurality of actuators 108 (ST707). As a result, one drive shaft 118 is moved in the positive Y axis direction by a predetermined distance, and the other drive shaft 118 is moved in the negative Y axis direction by the same predetermined distance, and vice versa.

Thus, as shown in FIG. 5 or 6, either one of the drive shafts 118 gives a force to the movable plate 120, thereby rotating the movable plate 120 about the shaft R (ST708). As a result, the moment of the force about the shaft R is generated to the holding unit 110G.

As described above, the force sense presentation apparatus 1 according to this embodiment is provided with the main body 110, the first movable unit 120 provided so as to be displaced in the Y axis direction with respect to the main body 110, the plurality of actuators 108 that cause the moment about the X axis to be generated to the holding unit 110G by displacing the first movable unit 120 in the Y axis direction, and the control unit 105 that controls the drive of the plurality of actuators 108. In a game, for example, on the basis of a result of the hit determination between the operation target (for example, a bat) of the user and a hit determination target (for example, a ball), the force sense presentation apparatus 1 drives the plurality of drive shafts 118 to cause the positions of the both end portions of the movable plate 120 to be displaced in the Y axis direction. Thus, the moment about the X axis is generated to the holding unit 110G, with the result that it is possible to present an instinctive force sense to the user who holds the force sense presentation apparatus 1. Further, it is possible to generate a moment to the force sense presentation apparatus 1 according to a display image, so it is possible to achieve an improvement of the operability and a highly realistic interaction.

In addition, the plurality of actuators 108 are provided to both end portions of the main body 110 in a longitudinal direction thereof with the actuators apart from each other in the Z axis direction. Therefore, the plurality of drive shafts 118A and 118B can directly give the force to the first end portion 120A and the second end portion 120B of the movable plate 120, so it is possible to reliably displace the movable plate 120 in the Y axis direction with the shaft R as the rotation shaft.

As specific examples in a game, a bat or a racket in the game are cited as the operation target of the user, and a ball is cited as an object that gives the force to the bat or the racket. In this case, when the bat or the racket hits the ball (hit determination is obtained), the movable plate 120 is tilted so that a moment corresponding to a reaction force thereof is generated to the holding unit 110G. As a result, it is possible to present the force sense to the user with reality at the instant when the ball is hit.

Further, in the case where the operation target of the user in a game is a fishing rod, and the object that gives the force to the fishing rod is fish, when the fish is hit, the position of the movable plate 120 is displaced to cause such a rotation force (moment) that the first end portion 120A is drawn downward to act on the main body 110. At this time, by controlling the drive force of the actuators 108 so as to generate moments having different degrees in accordance with kinds or the like of the fish as the target, it is possible to present a more realistic force sense to the user.

In addition, the force sense presentation apparatus 1 may be used for games of various kinds of trainings.

For example, the apparatus can be used in a game for practicing a percussion instrument such as a drum. Specifically, an image of a drum is displayed on the display screen of the display apparatus 3, and the force sense presentation apparatus 1 is used instead of a stick. In this case, the operation target of the user in the game is the stick, and the object that gives the force to the stick is a drum. When the stick is hit with respect to the drum (hit determination is obtained), the movable plate 120 is tilted so that a moment corresponding to a reaction force thereof is generated to the holding unit 110G, with the result that it is possible to present the user with the force sense with reality like an actual practice of drum playing. In particular, in the actual practice of musical instruments such as a drum, preparing such instruments is a large-scale task. However, with the use of the force sense presentation apparatus 1, it is possible to practice a drum easily.

Furthermore, the force sense presentation apparatus 1 can also be used in a game for practicing cooking. Specifically, food materials such as a vegetable, a chopping board, and a knife are displayed on the display screen of the display apparatus 3, and the user uses the force sense presentation apparatus 1 instead of the knife. The operation target of the user in the game is the knife, and the object that gives the force to the knife is the vegetable or the chopping board. In this case, when the vegetable or the chopping board is brought into contact with the knife (hit determination is obtained), the movable plate 120 is tilted so that a moment corresponding to a kind of the food materials or a texture of the chopping board is generated to the holding unit 110G, with the result that it is possible to present the force sense with reality at the instant when the food material is cut to the user. In particular, in the actual cooking practice, the food materials are finite. However, with the use of the force sense presentation apparatus 1, it is possible to repeat the cooking practice with reality as many times as desired.

Second Embodiment

Figure 8:
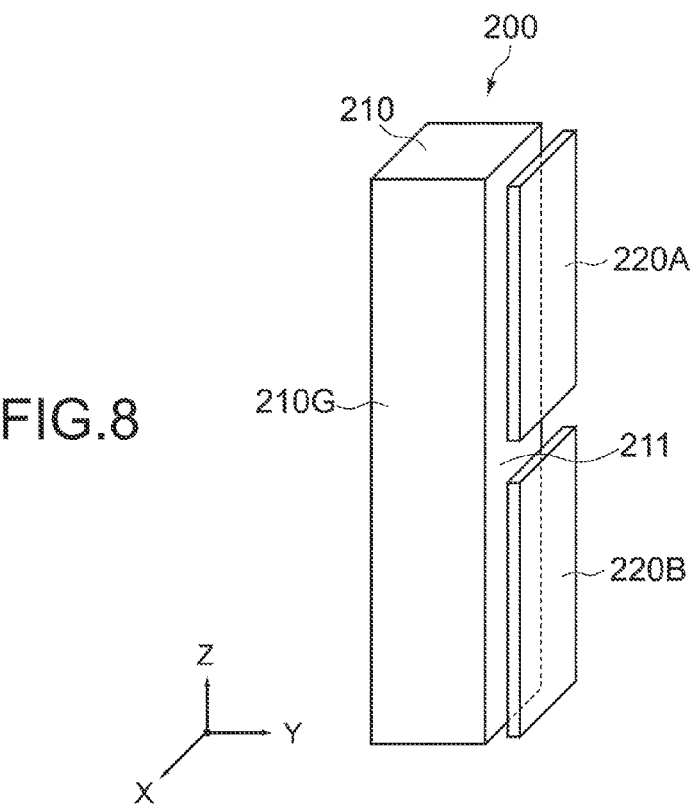
FIG. 8 is a perspective view showing a force sense presentation apparatus according to a second embodiment of the present disclosure.
Figure 9:
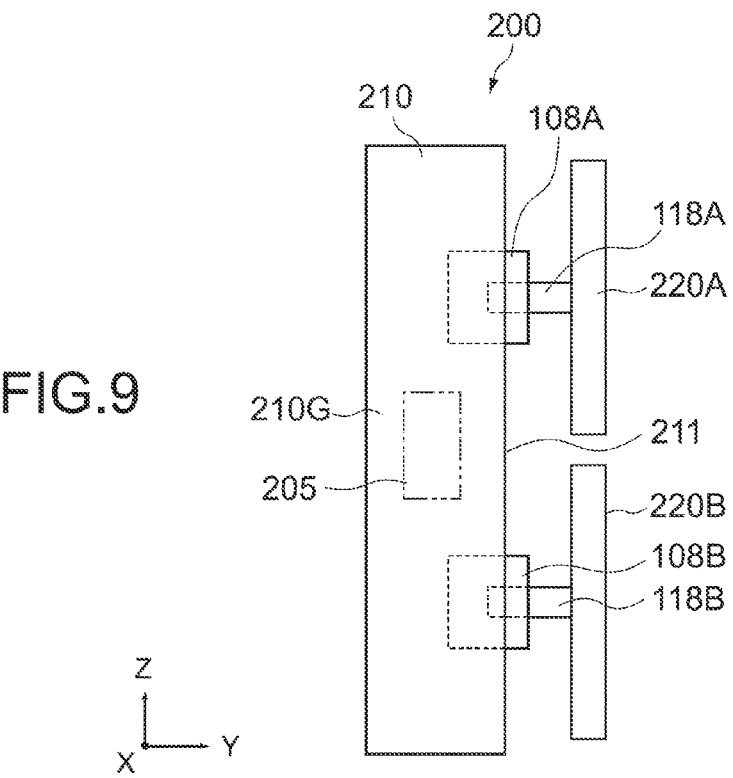
FIG. 9 is a side view showing the force sense presentation apparatus shown in FIG. 8, in which the structures of main parts are shown exaggeratingly for ease of explanation.

FIG. 8 is a perspective view showing a force sense presentation apparatus according to a second embodiment of the present disclosure, and FIG. 9 is a side view showing the force sense presentation apparatus shown in FIG. 8, in which the structures of main parts are shown exaggeratingly for ease of explanation. It should be noted that in this embodiment, the arrangement positions of the plurality of actuators and the structure of the movable unit are different as compared to the embodiments, so the same components and the like are denoted by the same reference symbols to omit explanations thereof, and different parts will be mainly described.

A force sense presentation apparatus 200 according to this embodiment has a main body 210 which is configured similarly to the main body 110 of the first embodiment. In the main body 210, the plurality of actuators 108A and 108B, a control unit 205, and the like are provided. The control unit 205 has the structure similar to the control unit 105 and controls the drives of the plurality of actuators 108A and 108B. To tip ends of the drive shafts 118A and 118B of the actuators 108A and 108B, a first movable plate 220A and a second movable plate 220B are connected, respectively. The first movable plate 220A and the second movable plate 220B are plate-shaped members (first movable unit) each having a plate shape and cover a part of a holding unit 210G of the main body 210. The first movable plate 220A and the second movable plate 220B are set apart from each other in a longitudinal direction (Z axis direction of FIG. 9) of the main body 210 and disposed in parallel to a side surface 211 of the main body 210.

FIG. 10 is a side view showing a state of the force sense presentation apparatus 200 shown in FIG. 9, and FIG. 11 is a side view showing another state of the force sense presentation apparatus 200 shown in FIG. 9.

The control unit 205 causes the drive shafts 118A and 118B of the actuators 108A and 108B to move in opposite directions to each other (linear mechanism unit). That is, in the case where the drive shaft 118A is moved in the positive Y axis direction as shown in FIG. 10, the control unit 205 causes the drive shaft 118B to move in the negative Y axis direction, and in the case where the drive shaft 118A is moved in the negative Y axis direction as shown in FIG. 10, the control unit 205 causes the drive shaft 118B to move in the positive Y axis direction. With this structure, the first and second movable plates 220A and 220B are moved in the opposite directions to each other, thereby generating, to the holding unit 210G, a moment about the X axis clockwise or counterclockwise.

According to this embodiment, it is possible to obtain the same operation and effect as the first embodiment, so a predetermined force sense in accordance with the operation of the main body 210 can be presented to the user.

In the force sense presentation apparatus 200 according to this embodiment, only the first movable plate 220A or the second movable plate 220B may be moved in the Y axis direction. With this structure, it is possible to locally give a force to the user. Further, at this time, it is possible to generate the moment of the force to the holding unit 210G of the force sense presentation apparatus 200.

Third Embodiment

Figure 12:
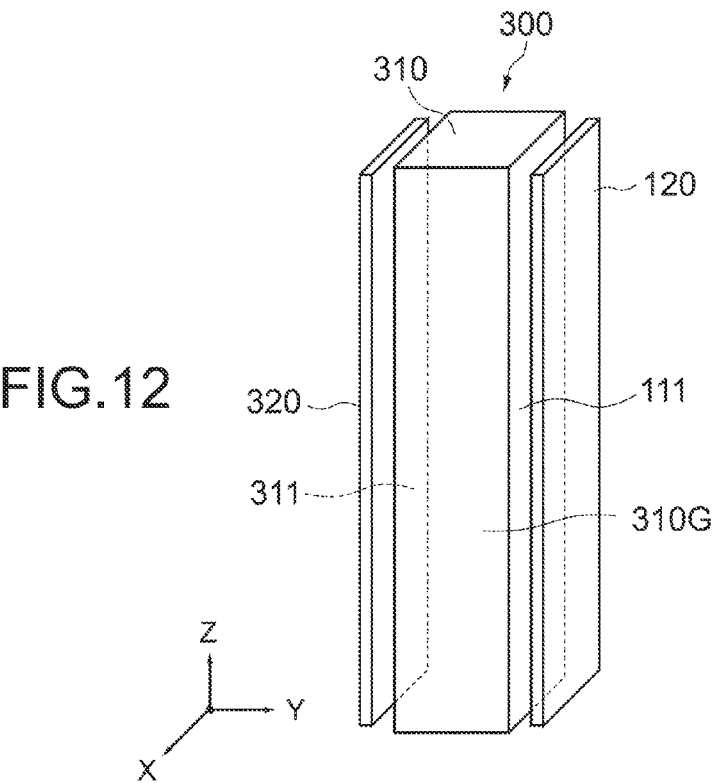
FIG. 12 is a perspective view showing a force sense presentation apparatus according to a third embodiment of the present disclosure.
Figure 13:
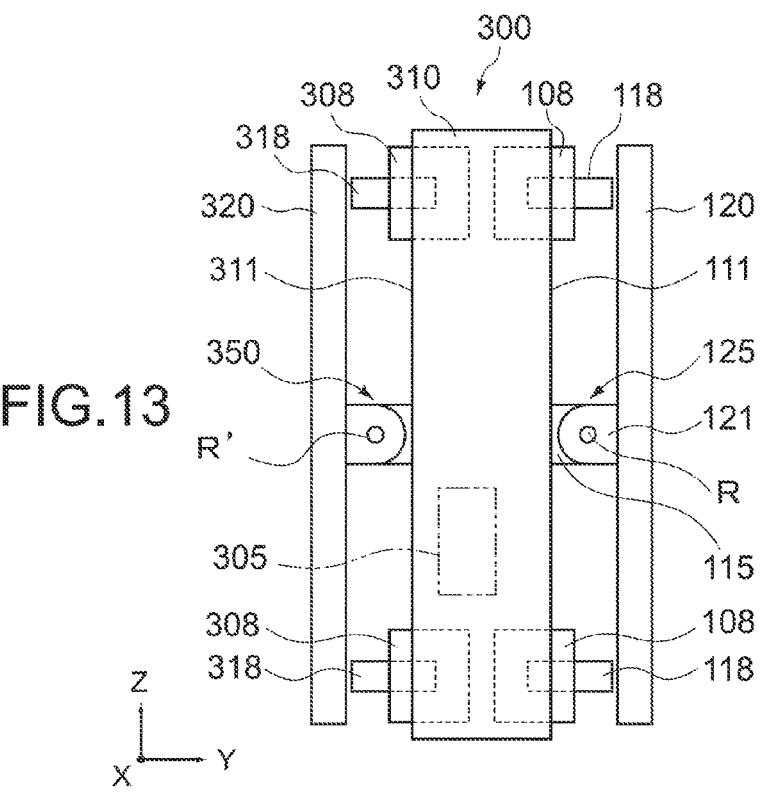
FIG. 13 is a side view showing the force sense presentation apparatus shown in FIG. 12.
Figure 14:
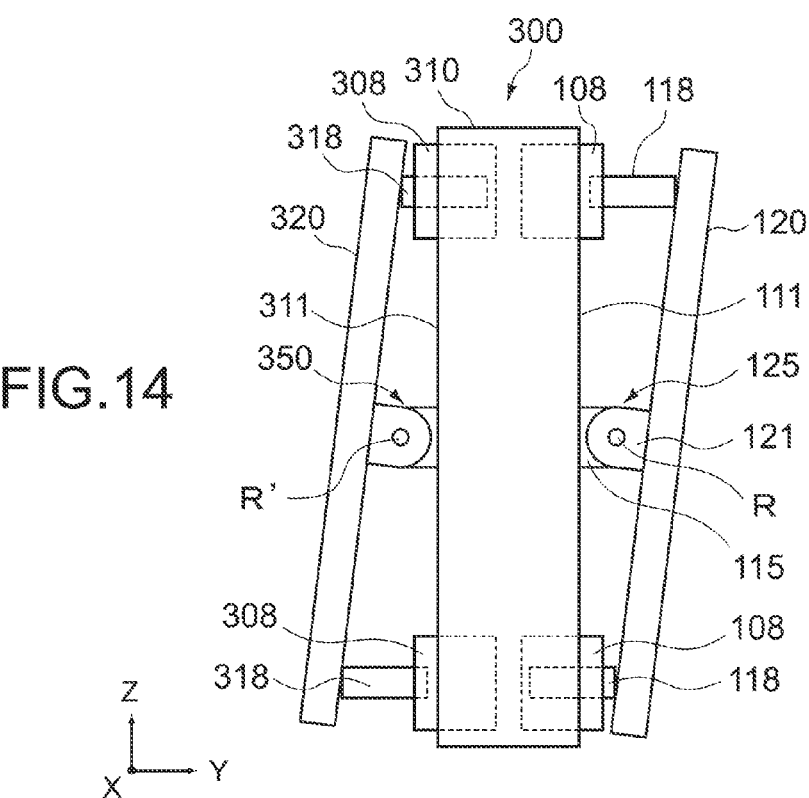
FIG. 14 is a side view showing a state of the force sense presentation apparatus shown in FIG. 13.
Figure 15:
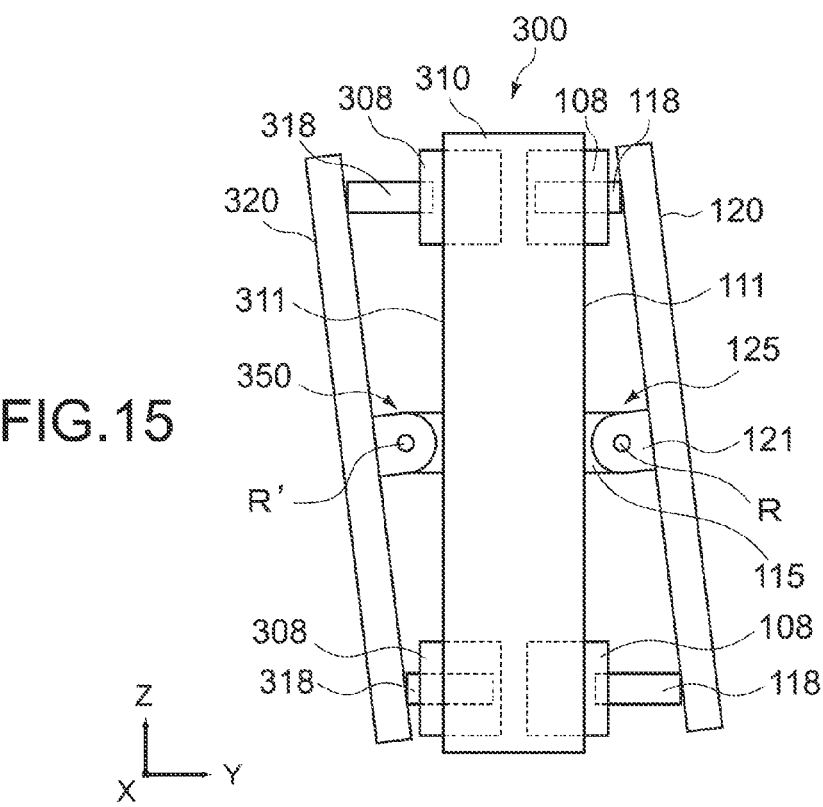
FIG. 15 is a side view showing another state of the force sense presentation apparatus shown in FIG. 13.

FIG. 12 is a perspective view showing a force sense presentation apparatus according to a third embodiment of the present disclosure. FIG. 13 is a side view showing the force sense presentation apparatus shown in FIG. 12. FIG. 14 is a side view showing a state of the force sense presentation apparatus shown in FIG. 13. FIG. 15 is a side view showing another state of the force sense presentation apparatus shown in FIG. 13. In those figures, the structures of main parts are shown exaggeratingly for ease of explanation.

A force sense presentation apparatus 300 according to this embodiment has the first movable plate 120 and a second movable plate 320 which are arranged in the Y axis direction so as to be opposed to each other with a main body 310 disposed therebetween. The force sense presentation apparatus 300 is provided with a plurality of actuators 308 capable of transmitting power to the second movable plate 320 and a control unit 305 that controls the drives of the actuators 108 and 308. The control unit 305 has the structure similar to the control unit 105, and the structure excluding the above components is the same as the first embodiment, so the same members and the like are denoted by the same reference symbols to omit the explanations thereof.

The second movable plate 320 is a plate-shaped member having a longitudinal direction along the Z axis direction, and is provided on the side of the side surface 111 of the main body 310 so that the positions of both ends thereof in the longitudinal direction can be displaced with respect to the side of a side surface 311 of the main body 310, which is opposite to the side surface 111. The second movable plate 320 is coupled to the main body 310 with a coupling unit 350 so as to be rotatable about a shaft R'. The plurality of actuators 308 are disposed to the main body 310 so that the both end portions of the second movable plate 320 can be pushed in the Y axis direction, and the drives thereof are controlled by the control unit 305.

FIG. 14 is the side view showing a state of the force sense presentation apparatus 300 shown in FIG. 13, and FIG. 15 is the side view showing another state of the force sense presentation apparatus 300 shown in FIG. 13.

The control unit 305 causes the drive shafts 118 of the two actuators 108 that drive the first movable plate 120 to move in opposite directions to each other and causes drive shafts 318 of the two actuators 308 that drive the second movable plate 320 to move in opposite directions to each other. Further, the control unit 305 causes the drive shafts 118 and 318 of the actuators 108 and 308 to move in opposite directions to each other.

That is, in the case where the first movable plate 120 is tilted clockwise about the shaft R as shown in FIG. 14, the control unit 305 drives the actuators 108 and 308 so that the second movable plate 320 is also tilted clockwise about the shaft R'. On the other hand, in the case where the first movable plate 120 is tilted counterclockwise about the shaft R as shown in FIG. 15, the control unit 305 drives the actuators 108 and 308 so that the second movable plate 320 is also tilted counterclockwise about the shaft R'. With this structure, it is possible to generate a clockwise or counterclockwise moment about the X axis to the holding unit 310G of the main body 310.

With the force sense presentation apparatus 300 having the above structure according to this embodiment, it is possible to obtain the same operation and effect as the first embodiment, so a predetermined force sense in accordance with the operation of the main body 310 can be presented to the user. According to this embodiment, because the two movable plates 120 and 320 are arranged with the main body 310 disposed therebetween, those movable plates occupy a larger part of an area held by the user. As a result, it is possible to appropriately present a desired force sense to the user.

Fourth Embodiment

Figure 16:
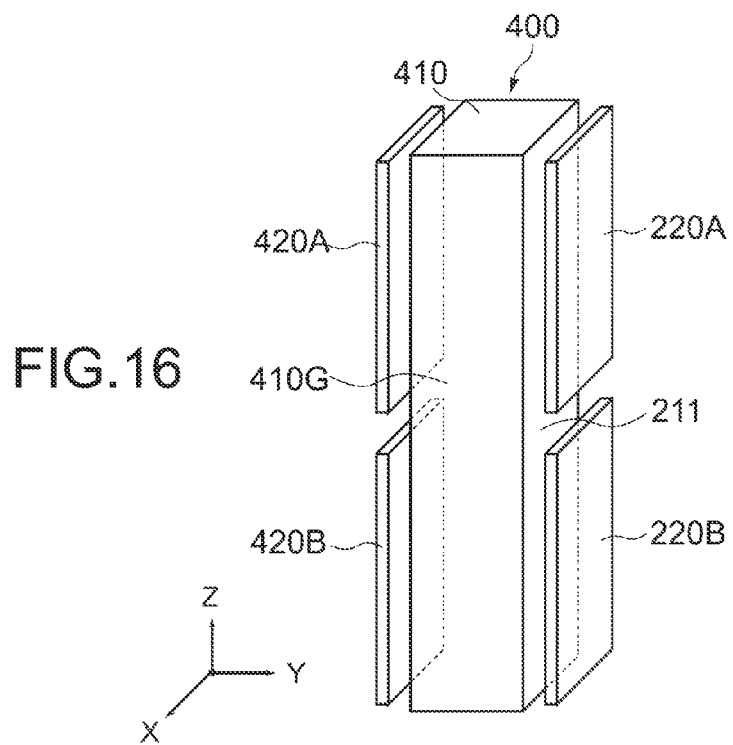
FIG. 16 is a perspective view showing a force sense presentation apparatus according to a fourth embodiment of the present disclosure.
Figure 17:
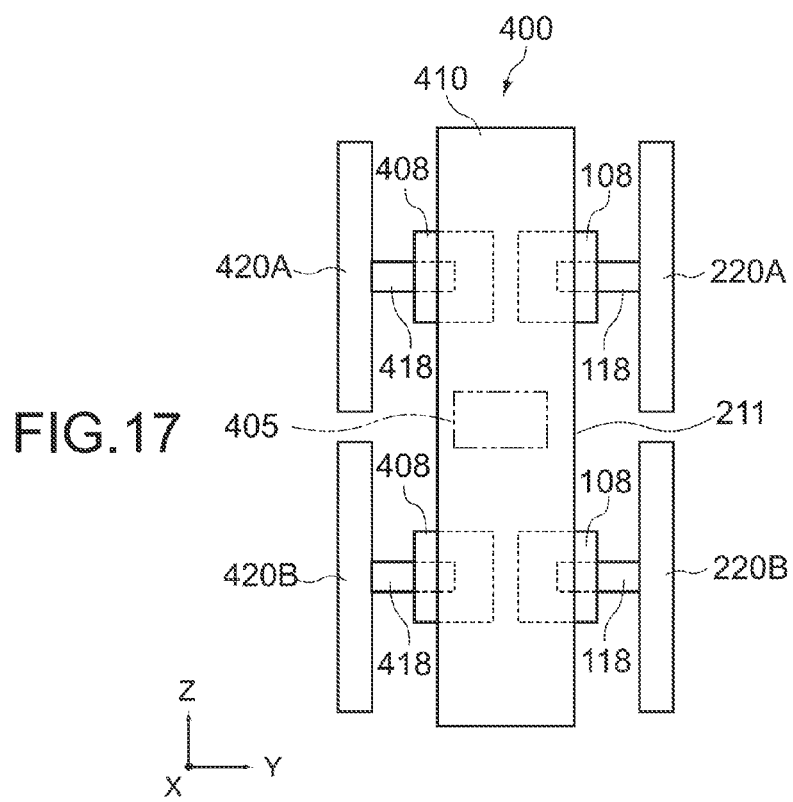
FIG. 17 is a side view showing the force sense presentation apparatus shown in FIG. 16.
Figure 18:
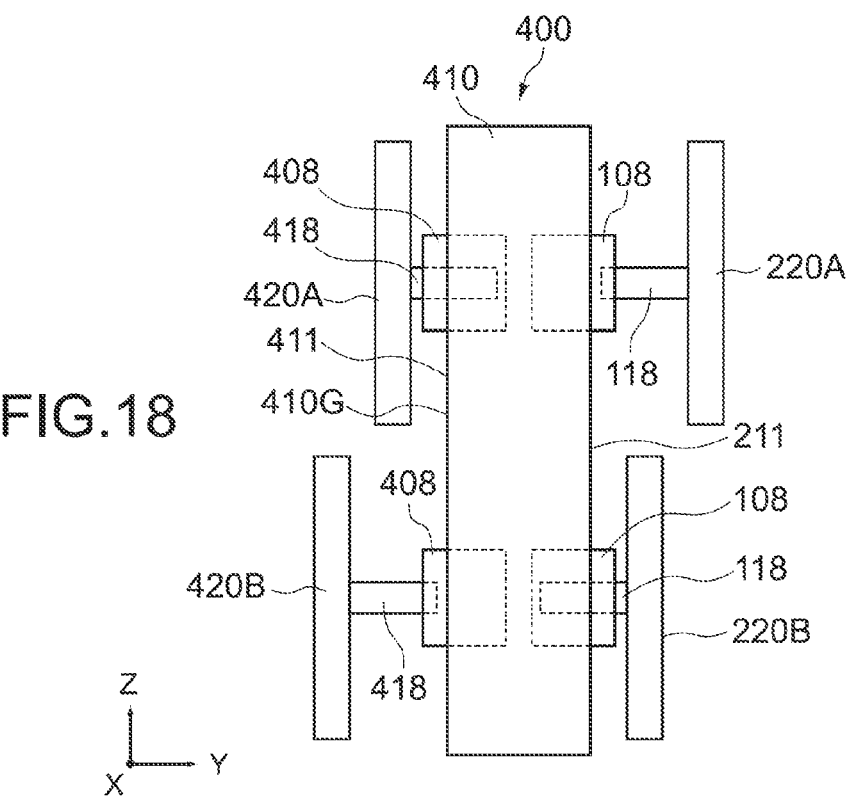
FIG. 18 is a side view showing a state of the force sense presentation apparatus shown in FIG. 17.
Figure 19:
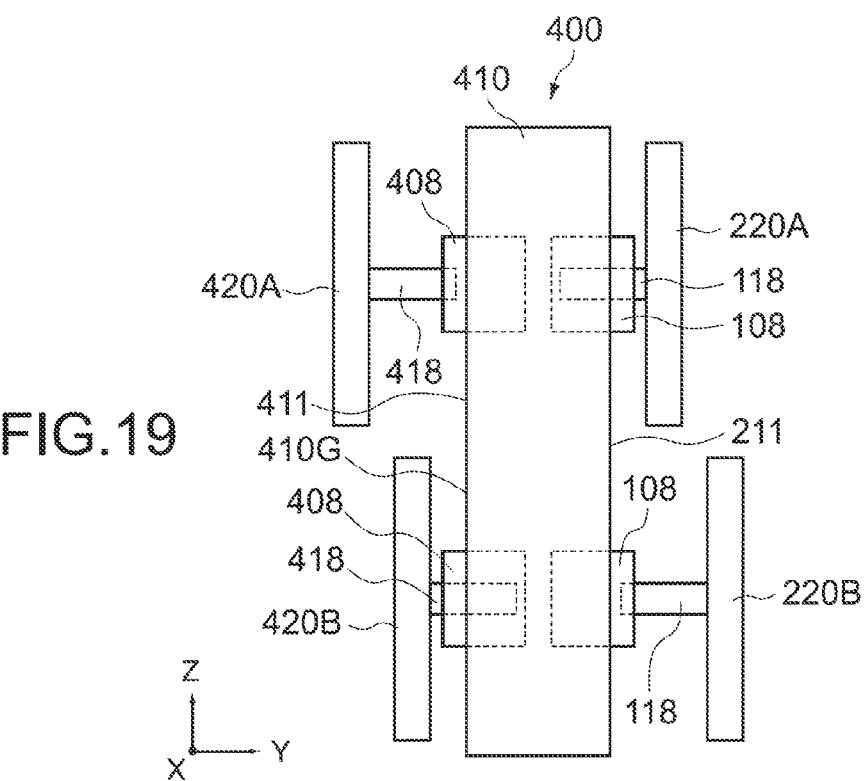
FIG. 19 is a side view showing another state of the force sense presentation apparatus shown in FIG. 17.

FIG. 16 is a perspective view showing a force sense presentation apparatus according to a fourth embodiment of the present disclosure. FIG. 17 is a side view showing the force sense presentation apparatus shown in FIG. 16. FIG. 18 is a side view showing a state of the force sense presentation apparatus shown in FIG. 17. FIG. 19 is a side view showing another state of the force sense presentation apparatus shown in FIG. 17. It should be noted that this embodiment has the structure similar to the second embodiment, so the same members and the like are denoted by the same reference symbols to omit explanations thereof. In those figures, the structures of main parts are shown exaggeratingly for ease of explanation.

A force sense presentation apparatus 400 has a third movable plate 420A and a fourth movable plate 420B. The third movable plate 420A is opposed to the first movable plate 220A in the Y axis direction with a main body 410 disposed therebetween, and the fourth movable plate 420B is opposed to the second movable plate 220B in the Y axis direction with the main body 410 disposed therebetween. The force sense presentation apparatus 400 is provided with the plurality of actuators 108 capable of transmitting power to the first and second movable plates 220A and 220B, a plurality of actuators 408 capable of transmitting power to the third and fourth movable plates 420A and 420B, and a control unit 405 that controls drives of the actuators 108 and 408. The control unit 405 has the structure similar to the control unit 105, and the structure excluding the above components is the same as the first embodiment.

The third movable plate 420A and the fourth movable plate 420B are plate-shaped members disposed on a side surface 411 of the main body 410 so as to be separated from each other in the Z axis direction. The main body 410 is equipped with the plurality of actuators 408 each having a drive shaft 418 coupled to the third and fourth movable plates 420A and 420B.

The control unit 405 causes the drive shafts 118 of the two actuators 108 that drive the first and second movable plates 220A and 220B to move in opposite directions to each other and causes the drive shafts 418 of the two actuators 408 that drive the third and fourth movable plates 420A and 420B to move in opposite directions to each other. Further, the control unit 405 causes the drive shaft 418 of the actuator 408 that drives the third movable plate 420A to move in the same direction as the drive shaft 118 of the actuator 108 that drives the first movable plate 220A and causes the drive shaft 418 of the actuator 408 that drives the fourth movable plate 420B to move in the same direction as the drive shaft 118 of the actuator 108 that drives the second movable plate 220B.

With the force sense presentation apparatus 400 having the above structure according to this embodiment, it is possible to obtain the same operation and effect as the second embodiment, so a predetermined force sense in accordance with the operation of the main body 410 can be presented to the user. According to this embodiment, the four movable plates 220A, 220B, 420A, and 420B are arranged so as to sandwich the main body 410, and therefore the movable plates occupy a larger part of the area held by the user. As a result, it is possible to appropriately present a desired force sense to the user.

Fifth Embodiment

Figure 20:
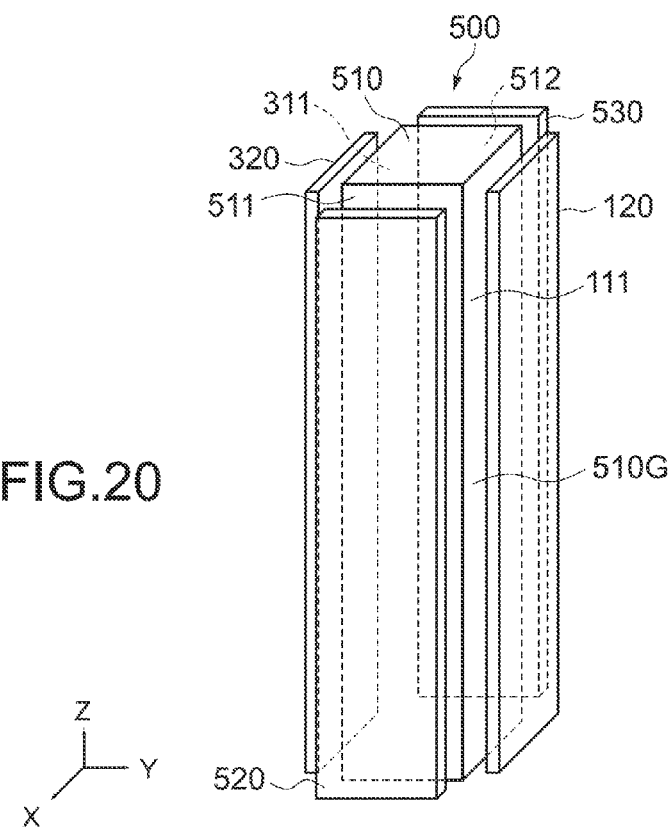
FIG. 20 is a perspective view showing a force sense presentation apparatus according to a fifth embodiment of the present disclosure.

FIG. 20 is a perspective view showing a force sense presentation apparatus according to a fifth embodiment of the present disclosure.

A force sense presentation apparatus 500 according to this embodiment has an approximately quadrangular prism shaped main body 510 having a longitudinal direction along the Z axis direction. The main body 510 has the two side surfaces 111 and 311 which are opposed to each other and the other two side surfaces 511 and 512 which are opposed to each other. To the side surfaces 111 and 311, the first movable plates 120 and 320 (first movable unit) are attached, respectively, and to the side surfaces 511 and 512, second movable plates 520 and 530 (second movable unit) are attached, respectively. The movable plates cover the entire periphery of a holding unit of the main body 510, and approximately center portions of the movable plates form a holding unit 510G held by the user.

The movable plates 120, 320, 520, and 530 have almost the same structure, and are each formed into a rectangular shape having a longitudinal direction along the Z axis direction. The movable plates 120, 320, 520, and 530 are configured in the same way as the movable plates described in the first and third embodiments, and are attached to the main body 510 via coupling units (not shown) at approximately center portions thereof in the longitudinal direction so as to be tilted. In this example, the first movable plates 120 and 320 are tilted about the X axis with respect to the main body 510, and the second movable plates 520 and 530 are tilted about the Y axis with respect to the main body 510.

In the main body 510, a plurality of actuators (not shown) that tilt the movable plates as described above and a control unit (not shown) that controls the drives of the plurality of actuators are provided. For example, the number of actuators is eight in total provided at end portions of the four side surfaces of the main body 510. The control unit drives an arbitrary actuator out of the plurality of actuators on the basis of a control signal transmitted from the control apparatus 2 (FIG. 1). For example, in the case where a moment about the X axis is generated with respect to the force sense presentation apparatus 500, a plurality of corresponding actuators are driven so that the first movable plates 120 and 320 are tilted in a predetermined direction as in the third embodiment. On the other hand, in the case where a moment about Y axis is generated with respect to the force sense presentation apparatus 500, a plurality of corresponding actuators are driven so that the second movable plates 520 and 530 are tilted in a predetermined direction.

As described above, with the force sense presentation apparatus 500 according to this embodiment, it is possible to generate the moment with a predetermined degree about the two axes (X axis and Y axis) perpendicular to each other, thereby making it possible to provide higher functional, multiple operability to the user.

Further, according to this embodiment, because the entire periphery of the main body 510 is covered with the movable plates 120, 320, 520, and 530, it is possible to present a moment in a desired direction to the user without largely depending on a posture of the force sense presentation apparatus 500 held by the user.

Sixth Embodiment

Figure 21:
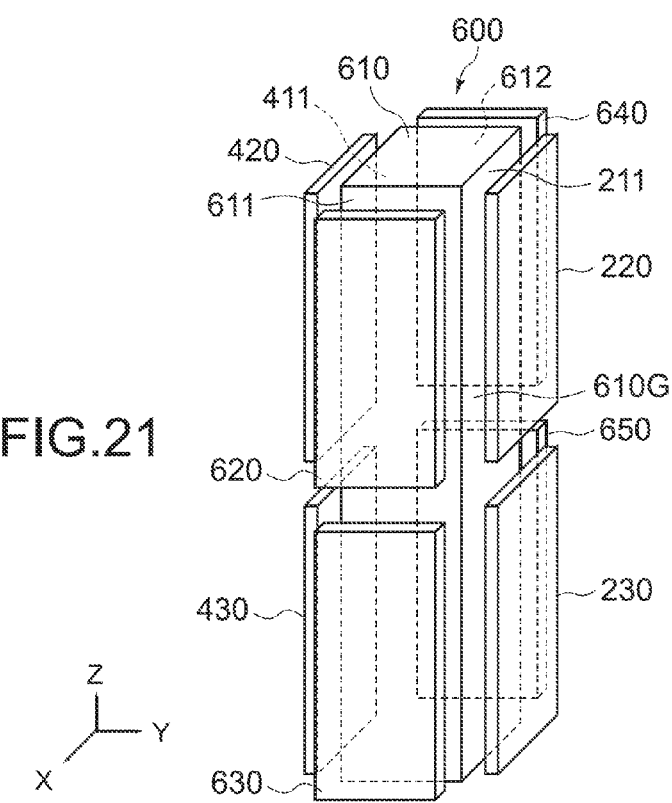
FIG. 21 is a perspective view showing a force sense presentation apparatus according to a sixth embodiment of the present disclosure.

FIG. 21 is a perspective view showing a force sense presentation apparatus according to a sixth embodiment of the present disclosure.

A force sense presentation apparatus 600 according to this embodiment has an approximately quadrangular prism shaped main body 610 having a longitudinal direction along the Z axis direction. The main body 610 has the two side surfaces 211 and 411 opposed to each other and the other two side surfaces 611 and 612 opposed to each other. To the side surface 211, the first movable plates (first movable unit) 220 and 230 are attached, and to the side surface 411, first movable plates (first movable unit) 420 and 430 are attached. To the side surface 611, second movable plates (second movable unit) 620 and 630 are attached, and to the side surface 612, second movable plates (second movable unit) 640 and 650 are attached. The movable plates cover the entire periphery of a holding unit of the main body 610, and approximately center portions of the movable plates form a holding unit 610G held by the user.

The movable plates 220, 230, 420, 430, 620, 630, 640, and 650 have almost the same structure, and are each formed into a rectangular shape having a longitudinal direction along the Z axis direction. The movable plates have the same structure as the movable plates described in the second and fourth embodiments and are attached to the main body 610 so as to be movable in the Y axis direction or X axis direction. In this example, the first movable plates 220, 230, 420, and 430 are movable in the Y axis direction with respect to the main body 610, and the second movable plates 620, 630, 640, and 650 are movable in the X axis direction with respect to the main body 610.

In the main body 610, a plurality of actuators (not shown) that move the movable plates as described above and a control unit (not shown) that controls the drives of the plurality of actuators are provided. For example, the number of actuators is eight in total provided at predetermined positions of the four side surfaces of the main body 610. The control unit drives an arbitrary actuator out of the plurality of actuators on the basis of a control signal transmitted from the control apparatus 2 (FIG. 1). For example, in the case where a moment about the X axis is generated with respect to the force sense presentation apparatus 600, a plurality of corresponding actuators are driven so that the first movable plates 220, 230, 420, and 430 are moved in a predetermined direction as in the fourth embodiment. On the other hand, in the case where a moment about Y axis is generated with respect to the force sense presentation apparatus 600, a plurality of corresponding actuators are driven so that the second movable plates 620, 630, 640, and 650 are moved in a predetermined direction.

As described above, with the force sense presentation apparatus 600 of this embodiment, it is possible to generate the moment with a predetermined degree about the two axes (X axis and Y axis) perpendicular to each other, thereby making it possible to provide higher functional, multiple operability to the user.

Further, according to this embodiment, because the entire periphery of the main body 610 is covered with the movable plates 220, 230, 420, 430, 620, 630, 640, and 650, it is possible to present a moment in a desired direction to the user without largely depending on a posture of the force sense presentation apparatus 600 held by the user.

Seventh Embodiment

Figure 22:
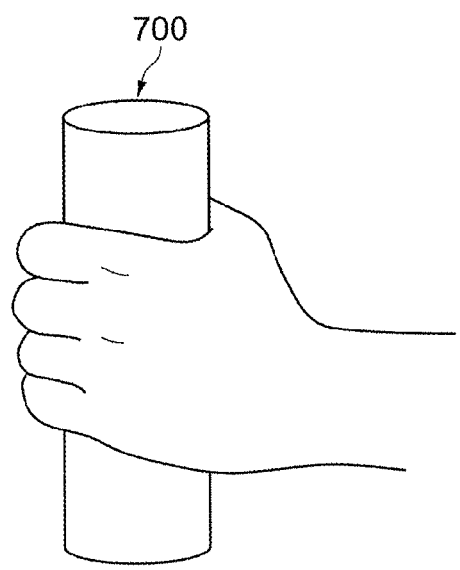
FIG. 22 is a perspective view showing a state in which a force sense presentation apparatus according to a seventh embodiment of the present disclosure is held.
Figure 23:
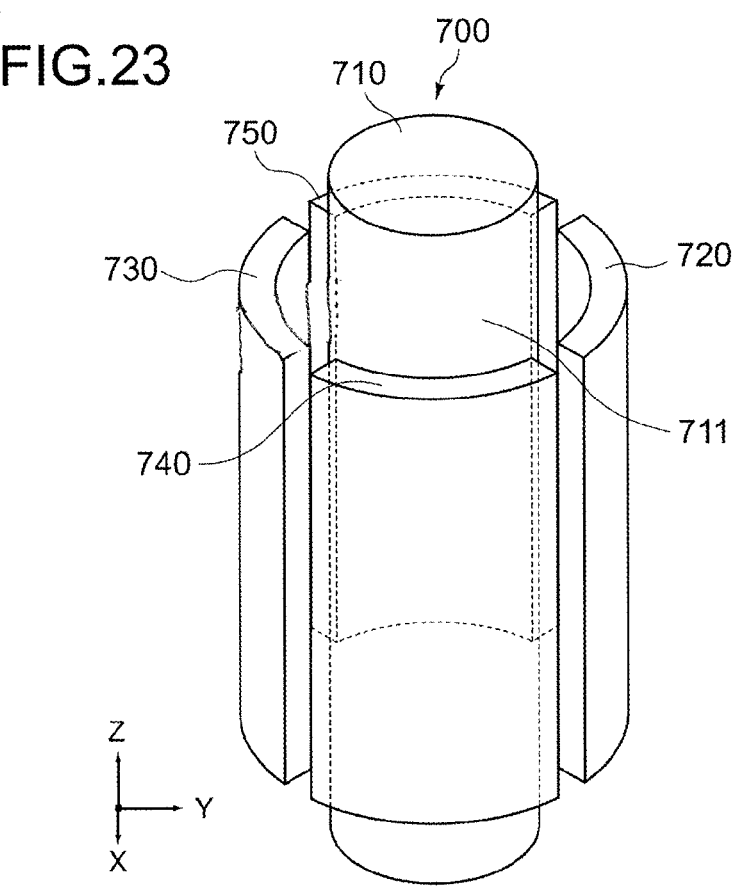
FIG. 23 is a perspective view of the force sense presentation apparatus shown in FIG. 22.

FIG. 22 is a perspective view showing a state in which a force sense presentation apparatus according to a seventh embodiment of the present disclosure is held. FIG. 23 is a perspective view of the force sense presentation apparatus shown in FIG. 22. In this embodiment, the shape of a main body and the shape of a plurality of movable units are different as compared to the fifth embodiment. The same members and the like are denoted by the same reference symbols, and the description will be given mainly on different parts.

A force sense presentation apparatus 700 according to this embodiment has a longitudinal direction along the Z axis direction and has an approximately columnar shape which can be held by the user.

The force sense presentation apparatus 700 according to this embodiment has a columnar shaped main body 710, a first movable plate 720, a second movable plate 730, a third movable plate 740, and a fourth movable plate 750 which are provided so as to be displaced with respect to the main body 710. Those movable plates each have a longitudinal direction along the Z axis direction, and are each formed into an arc shape concentrically with the main body 710.

Figure 24:
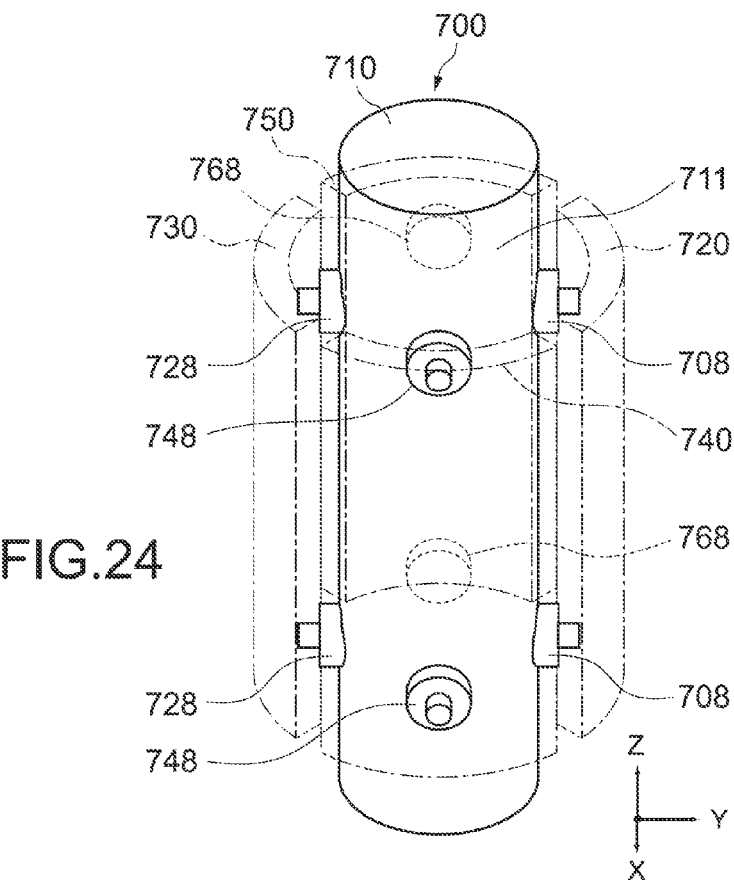
FIG. 24 is a perspective view showing a main body of the force sense presentation apparatus shown in FIG. 23.

FIG. 24 is a perspective view showing the main body 710 of the force sense presentation apparatus 700 shown in FIG. 23.

On a side circumferential surface 711 of the main body 710, a plurality of actuators 708 and 728 opposed to each other in the Y axis direction with the main body 710 disposed therebetween and a plurality of actuators 748 and 768 opposed to each other in the X axis direction with the main body 710 disposed therebetween are provided. A pair of actuators 708 is disposed so as to be separated from each other in the Z axis direction and coupled with the first movable plate 720. In the same way, a pair of actuators 728, a pair of actuators 748, and a pair of actuators 768 are each disposed so as to be separated from each other in the Z axis direction and are coupled to the second movable plate 730, the third movable plate 740, and the fourth movable plate 750, respectively. The movable plates 720, 730, 740, and 750 are supported through coupling units (not shown) so as to be tilted with respect to the main body 710.

Figure 25:
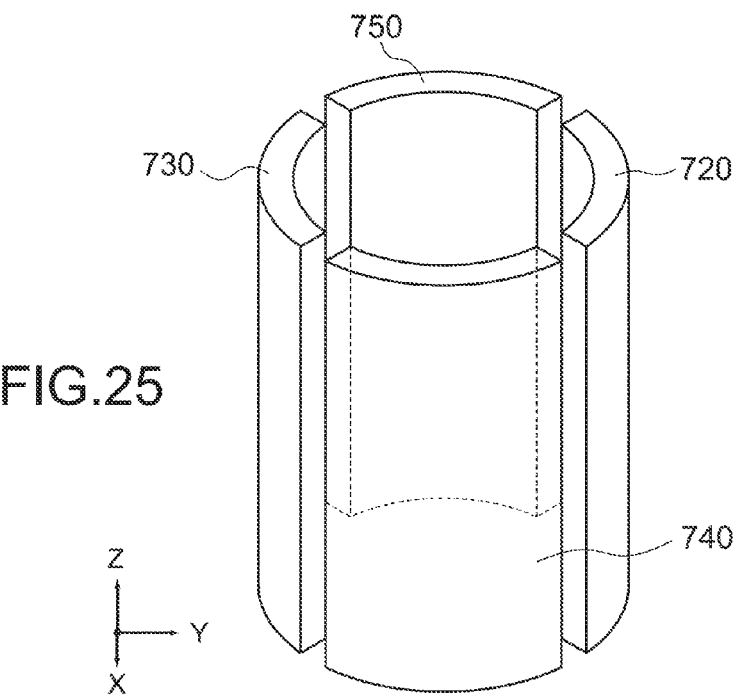
FIG. 25 is a perspective view showing a plurality of movable units of the force sense presentation apparatus 700 shown in FIG. 23.
Figures 26A, 26B:
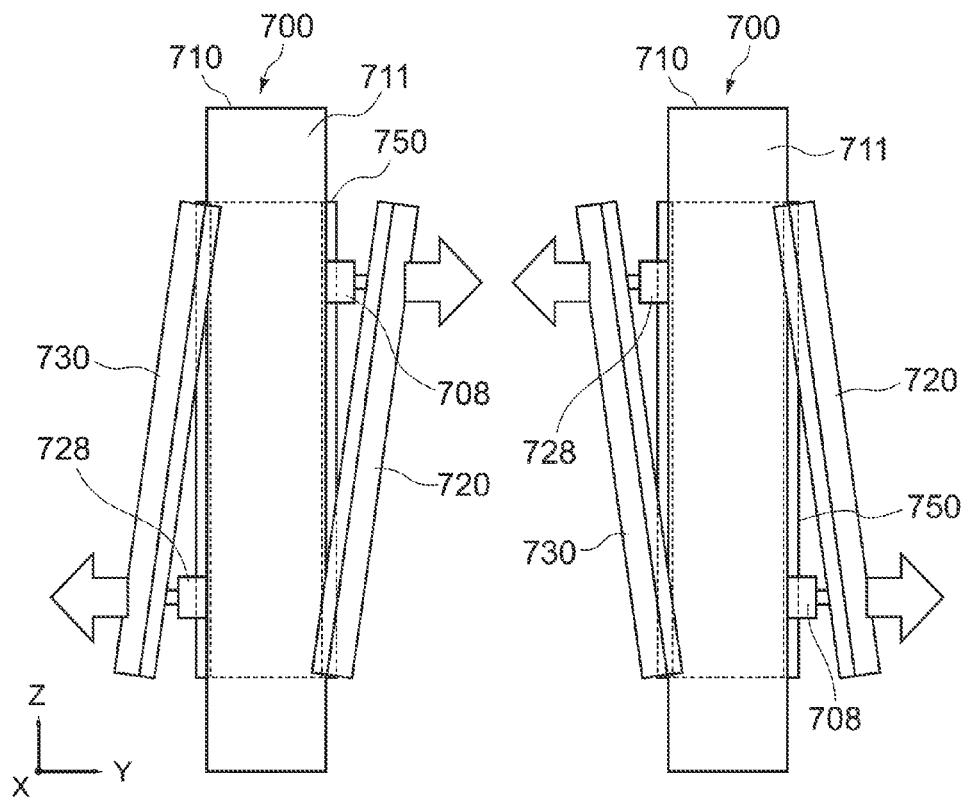
FIG. 26 are side views showing a movable state of the movable units of the force sense presentation apparatus 700 shown in FIG. 23.

FIG. 25 is a perspective view showing the first to fourth movable plates 720, 730, 740, and 750 of the force sense presentation apparatus 700 shown in FIG. 23, and FIGS. 26A and 26B are side views showing a movable state of the first movable plate 720 and the second movable plate 730 of the force sense presentation apparatus 700 shown in FIG. 23. It should be noted that in FIG. 26, the third movable plate 740 is not shown.

As in the third embodiment, the first movable plate 720 and the second movable plate 730 are tilted about the X axis in the same direction, thereby generating a predetermined moment about the X axis. On the other hand, the third movable plate 740 and the fourth movable plate 750 are tilted about the Y axis in the same direction, thereby generating a predetermined moment about the Y axis. As a result, the same operation as the fifth embodiment is obtained, thereby making it possible to present the moments about the two axes, i.e., the X axis and the Y axis, to the user.

The force sense presentation apparatus 700 according to this embodiment has the approximately columnar shape, so the user easily holds the apparatus, and thus a feeling of gripping a bat, a racket, a fishing rod, or the like can be presented. Further, by adjusting the drive forces of the plurality of actuators to appropriate degrees, it is also possible to give the holding unit the hardness or flexibility at the time of operation.

First Modified Example

Figure 27:
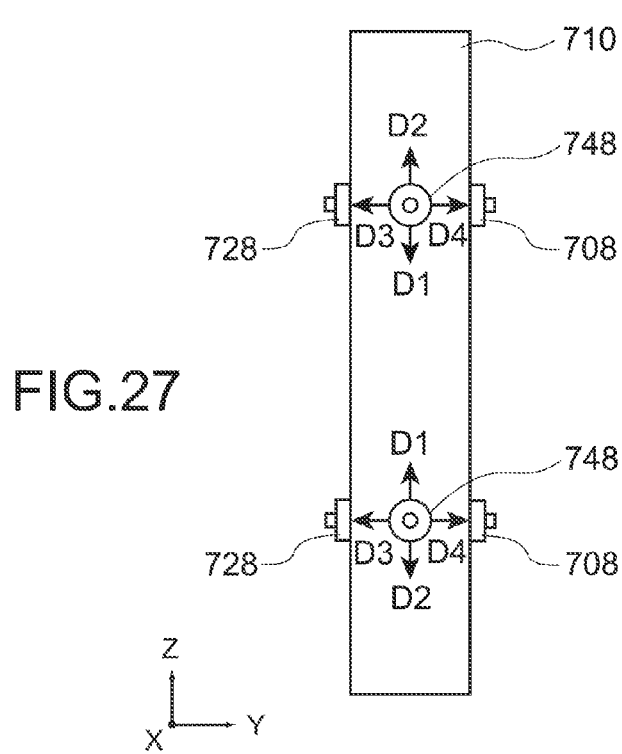
FIG. 27 is a diagram for explaining a force sense presentation apparatus of a first modified example of the embodiment.

FIG. 27 is a diagram for explaining a force sense presentation apparatus of a first modified example of the embodiment. It should be noted that in FIG. 27, the first movable plate 720, the second movable plate 730, the third movable plate 740, and the fourth movable plate 750 are not shown for ease of explanation.

In this modified example, the plurality of actuators 708, 728, 748, and 768 are provided so as to be movable electrically or manually in a longitudinal direction of the main body 710 and in a direction perpendicular to the longitudinal direction (directions indicated by arrows shown in FIG. 27) on the side circumferential surface 711 of the main body 710.

With this structure, when the positions of the plurality of actuators 708, 728, 748, and 768 are moved in a direction D1, that is, moved closer to the center position of the longitudinal direction of the main body 710, in the case where the actuators are driven with the same stroke, the amounts of displacements of the movable plates 720, 730, 740, and 750 can be increased. In other words, the tilts of the movable units can be further increased. On the other hand, when the positions of the plurality of actuators are moved in a direction D2, that is, moved closer to the both ends of the main body 710, the amounts of displacements of the movable plates can be decreased. Further, the positions of the actuators may be moved in a direction D3 or D4 along the side circumferential surface 711, thereby generating a moment about the Z axis. In this way, it is possible to generate the moments with different degrees with the same actuators, and thus various force senses can be presented to the user.

Second Modified Example

Figure 28:
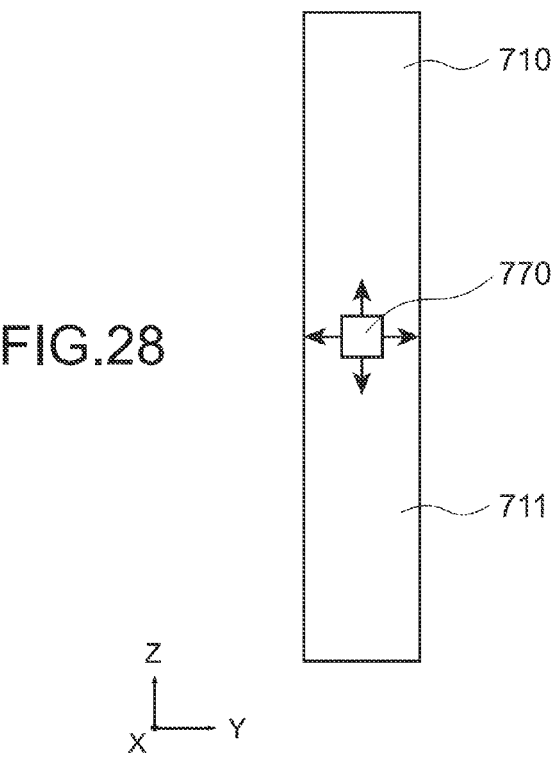
FIG. 28 is a diagram for explaining a force sense presentation apparatus of a second modified example of the embodiment.
Figure 29:
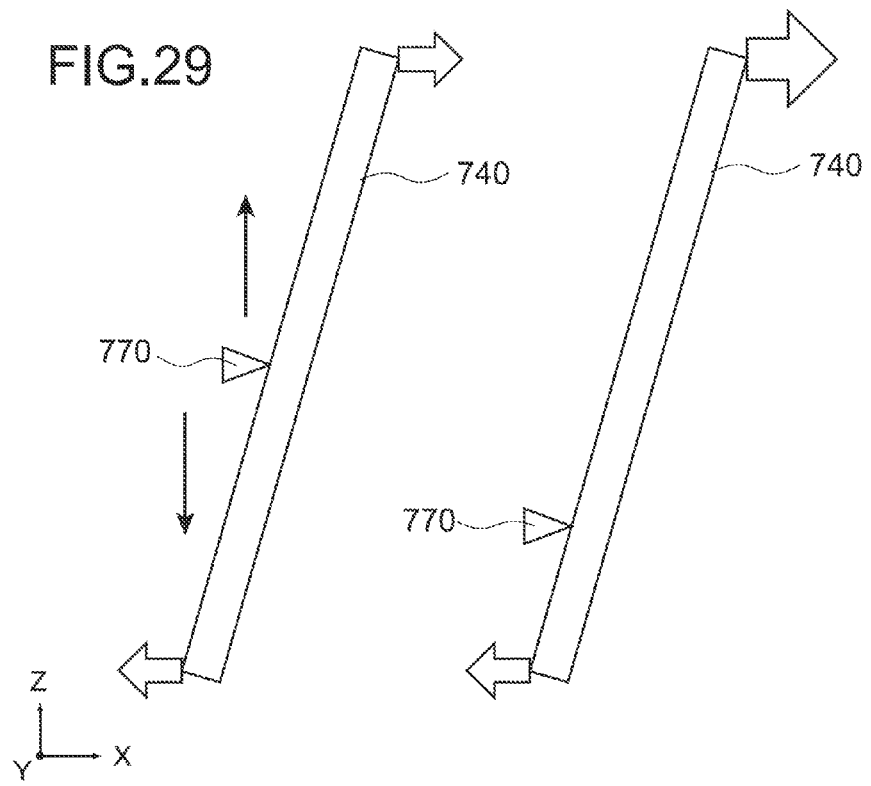
FIG. 29 is a diagram for explaining the force sense presentation apparatus shown in FIG. 28.

FIG. 28 is a diagram for explaining a force sense presentation apparatus of a second modified example of the embodiment, and FIG. 29 is a diagram for explaining the force sense presentation apparatus shown in FIG. 28. It should be noted that in FIG. 28, the structure excluding a coupling unit 770 that couples the main body 710 and the third movable unit 740 with each other is the same as the first modified example and therefore is not shown.

In FIGS. 28 and 29, the coupling unit 770 is schematically shown, but as in the above embodiment, in the coupling unit 770, a coupling projection portion provided to the main body 710 and a coupling projection portion provided to the movable plate 740 are coupled with each other with the same shaft parallel to the Y axis being as a rotation shaft. In this modified example, the position of the coupling unit 770 is electrically or manually movable in the longitudinal direction of the main body 710 and in the direction perpendicular to the longitudinal direction (directions indicated by the arrows shown in FIG. 28) on the side circumferential surface 711 of the main body 710.

Specifically, as shown in FIG. 29, when the position of the coupling unit 770 is disposed at the center in the longitudinal direction (Z axis direction) of the main body 710, one drive shaft of the actuators 748 is extended by a predetermined length, and the other drive shaft is shortened by the predetermined length (see, FIG. 27). At this time, the degrees of the moments of the force about the shafts on the coupling unit 770 are the same at the both ends of the movable plate 740. In contrast, in the case where the position of the coupling unit 770 is displaced from the center in the longitudinal direction (Z axis direction) of the main body 710 to one direction (downward in FIG. 29), for example, the position of one actuator 748 may be shifted downward in the longitudinal direction to make it possible for the drive shaft of the actuator 748 to give the force to the movable plate 740.

With this structure, by adjusting the position of the coupling unit 770, it is possible to adjust a maximum value of the amount of displacement of the movable plate 740 with the use of the same actuator 748 as the actuator 748 used in the above modified example. That is, the displacement of the movable plate 740 can adjust the maximum value of the moment of the force capable of being presented to the user.

It should be noted that in this modified example, the coupling unit 770 that couples the main body 710 and the third movable plate 740 is described, and it is possible to configure coupling units that couple the main body 710 with each of the first movable plate 720, the second movable plate 730, and the fourth movable plate 750, so as to be movable in the same way.

As described above, the embodiments of the present disclosure are described, but the present disclosure is not limited to the above embodiments and the above modified examples, and can of course be variously changed without departing from the gist of the present disclosure.

In the above embodiments and modified examples, the predetermined moment is generated with respect to the main body by moving the movable plates in the Y axis direction or the X axis direction by the predetermined length, but is not limited to this. For example, by vibrating the movable plates at a predetermined frequency or amplitude, a predetermined moment may be generated with respect to the main body. As a result, it is possible to present the more realistic force sense to the user depending on a scene of a game. For example, the structure is effective at the instant when a ball is hit with a bat and the instant when fish hits a fishing rod.

In the above embodiments and modified examples, the control apparatus 2 performs the hit determination, and the force sense presentation apparatus 1 branches the process on the basis of the determination result as an example, but another example can be adopted. For example, the force sense presentation apparatus 1 may obtain, from the control apparatus 2, the position information of the operation target of the user and the position information of the hit determination target, calculate the latest position of the operation target on the basis of the information relating to the movement of the main body 110 detected by the position and tilt measurement unit 104, and compare the position information of the operation target of the user with the position information of the hit determination target, to perform the hit determination by the force sense presentation apparatus 1.

In the above embodiments and modified examples, the force sense presentation apparatus 1 calculates the position of the operation target of the user as an example. However, another example may be adopted. For example, the force sense presentation apparatus may transmit, to the control apparatus 2, the information relating to the movement of the force sense presentation apparatus detected by the position and tilt measurement unit 104 without calculating the position of the operation target of the user with the use of the information relating to the movement of the force sense presentation apparatus detected by the position and tilt measurement unit 104, and the control apparatus 2 may calculate the position of the operation target of the user with the use of the information relating to the movement of the force sense presentation apparatus. With this structure, it is possible to reduce the burden on the control unit of the force sense presentation apparatus.

In the first to sixth embodiments, the first movable plate 120 and the like are the plate-shaped members. However, the shape of the first movable unit 120 and the like is not limited to this. For example, in order to cause the movable units to be easily held by the user, the shape of the movable units may be formed into such shape as to be fit to a hand of the user.

It should be noted that the present disclosure can take the following configurations.

(1) A force sense presentation apparatus, including:
a main body having a longitudinal direction in a first axis direction and including a holding unit held by a user;
a first movable unit configured to cover at least a part of the holding unit, the first movable unit being capable of being displaced with respect to the main body in a second axis direction which intersects the first axis; and
a first drive mechanism provided to the main body and configured to cause the first movable unit to be displaced in the second axis direction with respect to the main body to generate a moment about a third axis to the holding unit, the third axis intersecting the first axis and the second axis.

(2) The force sense presentation apparatus according to Item (1), in which
the first drive mechanism includes a plurality of drive sources disposed separately from each other in the first axis direction.

(3) The force sense presentation apparatus according to Item (2), in which
the first movable unit is a plate-shaped member having a longitudinal direction in the first axis direction, and the first drive mechanism further includes a tilt mechanism unit capable of tilting the plate-shaped member about the third axis by driving the plurality of drive sources.

(4) The force sense presentation apparatus according to Item (3), in which the plate-shaped member has a first end portion and a second end portion which are separated from each other in the first axis direction, and the tilt mechanism unit includes a first drive source capable of moving the first end portion, a second drive source capable of moving the second end portion in a direction opposite to a movement direction of the first end portion, and a coupling unit disposed between the first drive source and the second drive source and configured to support the plate-shaped member rotatably about an axis parallel to the third axis.

(5) The force sense presentation apparatus according to Item (2), in which the first movable unit includes a first plate-shaped member having a longitudinal direction in the first axis direction, and a second plate-shaped member opposed to the first plate-shaped member in the second axis direction with the main body disposed therebetween, and the first drive mechanism includes a tilt mechanism unit capable of tilting the first plate-shaped member and the second plate-shaped member about the third axis by driving the plurality of drive sources.

(6) The force sense presentation apparatus according to Item (2), in which the first movable unit includes a first plate-shaped member and a second plate-shaped member which are separated from each other in the first axis direction, and the first drive mechanism includes a direct acting mechanism unit configured to move the first plate-shaped member and the second plate-shaped member in opposite directions to each other along the second axis direction by driving the plurality of drive sources.

(7) The force sense presentation apparatus according to Item (6), in which the first movable unit further includes a third plate-shaped member opposed to the first plate-shaped member with the main body disposed therebetween, and a fourth plate-shaped member opposed to the second plate-shaped member with the main body disposed therebetween, and the first drive mechanism moves the third plate-shaped member in the same direction as the first plate-shaped member and moves the fourth plate-shaped member in the same direction as the second plate-shaped member.

(8) The force sense presentation apparatus according to any one of Items (2) to (7), in which the plurality of drive sources are formed of direct acting actuators.

(9) The force sense presentation apparatus according to any one of Items (2) to (7), in which the plurality of drive sources are formed of vibration motors.

(10) The force sense presentation apparatus according to any one of Items (1) to (9), further including:

a second movable unit configured to cover another part of the holding unit, the second movable unit being capable of being displaced in the third axis direction with respect to the main body; and a second drive mechanism provided to the main body and configured to cause the second movable unit to be displaced in the third axis direction with respect to the main body to generate a moment about the second axis to the holding unit.

The present disclosure contains subject matter related to that disclosed in Japanese Priority Patent Application JP 2011-219224 filed in the Japan Patent Office on Oct. 3, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A force sense presentation apparatus, comprising:
a main body having a longitudinal direction in a first axis direction and including a holding unit configured to be held by a user;
a first movable unit configured to cover at least a part of the holding unit, the first movable unit being capable of being displaced with respect to the main body in a second axis direction which intersects the first axis; and
a first drive mechanism provided to the main body and configured to cause the first movable unit to be displaced in the second axis direction with respect to the main body to generate a moment about a third axis, the third axis intersecting the first axis and the second axis, wherein the first drive mechanism is configured to displace the first movable unit in a positive direction along the second axis direction in response to a first electrical drive signal and to displace the first movable unit in a negative direction along the second axis direction in response to a second electrical drive signal.

2. The force sense presentation apparatus according to claim 1, wherein
the first drive mechanism includes a plurality of drive sources disposed separately from each other in the first axis direction.

3. The force sense presentation apparatus according to claim 2, wherein
the first movable unit is a plate-shaped member having a longitudinal direction in the first axis direction, and
the first drive mechanism further includes a tilt mechanism unit capable of tilting the plate-shaped member about the third axis by driving the plurality of drive sources.

4. The force sense presentation apparatus according to claim 3, wherein
the plate-shaped member has a first end portion and a second end portion which are separated from each other in the first axis direction, and
the tilt mechanism unit includes
a first drive source capable of moving the first end portion,
a second drive source capable of moving the second end portion in a direction opposite to a movement direction of the first end portion, and
a coupling unit disposed between the first drive source and the second drive source and configured to support the plate-shaped member rotatably about an axis parallel to the third axis.

5. The force sense presentation apparatus according to claim 2, wherein
the first movable unit includes
a first plate-shaped member having a longitudinal direction in the first axis direction, and a second plate-shaped member opposed to the first plate-shaped member in the second axis direction with the main body disposed therebetween, and the first drive mechanism includes a tilt mechanism unit capable of tilting the first plate-shaped member and the second plate-shaped member about the third axis by driving the plurality of drive sources.

6. The force sense presentation apparatus according to claim 2, wherein the first movable unit includes a first plate-shaped member and a second plate-shaped member which are separated from each other in the first axis direction, and the first drive mechanism includes a direct acting mechanism unit configured to move the first plate-shaped member and the second plate-shaped member in opposite directions to each other along the second axis direction by driving the plurality of drive sources.

7. The force sense presentation apparatus according to claim 6, wherein the first movable unit further includes a third plate-shaped member opposed to the first plate-shaped member with the main body disposed therebetween, and a fourth plate-shaped member opposed to the second plate-shaped member with the main body disposed therebetween, and the first drive mechanism moves the third plate-shaped member in the same direction as the first plate-shaped member and moves the fourth plate-shaped member in the same direction as the second plate-shaped member.

8. The force sense presentation apparatus according to claim 2, wherein the plurality of drive sources are formed of direct acting actuators.

9. The force sense presentation apparatus according to claim 2, wherein the plurality of drive sources are formed of vibration motors.

10. The force sense presentation apparatus according to claim 1, further comprising:

a second movable unit configured to cover another part of the holding unit, the second movable unit being capable of being displaced in the third axis direction with respect to the main body; and a second drive mechanism provided to the main body and configured to cause the second movable unit to be displaced in the third axis direction with respect to the main body to generate a moment about the second axis to the holding unit.

11. The force sense presentation apparatus according to claim 1, further comprising a control unit configured to generate the first and second electrical drive signals.

12. The force sense presentation apparatus according to claim 11, wherein the control unit generates the first and second electrical drive signals in response to receiving information relating the force sense presentation apparatus to an object displayed on a display.

13. The force sense presentation apparatus according to claim 12, wherein the information relating the force sense presentation apparatus to an object displayed on a display includes a hit determination between the force sense presentation apparatus and the object.

* * * * *